(12) United States Patent
Tull et al.

(10) Patent No.: US 10,481,859 B2
(45) Date of Patent: Nov. 19, 2019

(54) AUDIO SYNCHRONIZATION AND DELAY ESTIMATION

(71) Applicant: POWERCHORD GROUP LIMITED, Exeter, Devon (GB)

(72) Inventors: Graham Tull, Exeter (GB); Troels Bastholm, Aalborg (DK); Mads Berre Eriksen, Aalborg (DK); Kurt Heick Rasmussen, Aalborg (DK); Jens Christian Lindof, Aalborg (DK)

(73) Assignee: POWERCHORD GROUP LIMITED, London (GB)

( * ) Notice: Subject to any disclaimer, the term of this patent is extended or adjusted under 35 U.S.C. 154(b) by 29 days.

(21) Appl. No.: 15/834,752

(22) Filed: Dec. 7, 2017

(65) Prior Publication Data
US 2019/0179597 A1    Jun. 13, 2019

(51) Int. Cl.
| | |
|---|---|
| G06F 3/16 | (2006.01) |
| H04R 3/12 | (2006.01) |
| H04R 3/04 | (2006.01) |
| H04R 5/02 | (2006.01) |
| H04R 27/00 | (2006.01) |
| H04S 7/00 | (2006.01) |

(52) U.S. Cl.
CPC .............. *G06F 3/165* (2013.01); *H04R 3/04* (2013.01); *H04R 3/12* (2013.01); *H04R 5/02* (2013.01); *H04R 27/00* (2013.01); *H04S 7/301* (2013.01); *H04R 2227/003* (2013.01); *H04R 2420/07* (2013.01)

(58) Field of Classification Search
CPC ................ G06F 3/16; H04R 3/12; H04R 3/24
USPC ......................................................... 700/94
See application file for complete search history.

(56) References Cited

U.S. PATENT DOCUMENTS

| | | | |
|---|---|---|---|
| 8,660,678 B1 * | 2/2014 | Lavi ..................... | G10H 1/0066 700/94 |
| 9,942,681 B2 | 4/2018 | Dufosse | |
| | | (Continued) | |

FOREIGN PATENT DOCUMENTS

WO    2006131893    12/2006

OTHER PUBLICATIONS

International Search Report and Written Opinion for PCT/EP2018/083975 dated Feb. 15, 2019, 16 pages.

*Primary Examiner* — Melur Ramakrishnaiah
(74) *Attorney, Agent, or Firm* — Morris & Kamlay LLP

(57) ABSTRACT

Systems and techniques are provided for audio synchronization and delay estimation. Audio metadata including a first discrete Fourier transform representation may be received. An audio signal may be pre-processed. A second discrete Fourier transform representation may be generated from the pre-processed audio signal. A correlation result in a discrete Fourier transform representation may be generated based on an element-wise multiplication of the first and second discrete Fourier transform representations. An inverse Fourier transform may be performed on the correlation result in a discrete Fourier transform representation to generate a correlated signal including samples that may have a position and a value. A relative delay value may be determined based on the position of a sample having a value with the greatest magnitude. Playback of a second audio signal may be adjusted based on a current delay value adjusted based on the relative delay value.

29 Claims, 9 Drawing Sheets

(56) References Cited

U.S. PATENT DOCUMENTS

| | | | |
|---|---|---|---|
| 2010/0177906 A1* | 7/2010 | Vetterli | A61B 5/7257 |
| | | | 381/74 |
| 2012/0087507 A1 | 4/2012 | Meyer | |
| 2014/0062779 A1* | 3/2014 | Al-Hassanieh | G01S 19/30 |
| | | | 342/357.63 |
| 2014/0328485 A1 | 11/2014 | Saulters | |
| 2017/0019743 A1 | 1/2017 | Tull | |
| 2017/0170918 A1* | 6/2017 | Nicolino, Jr. | H04W 4/90 |

* cited by examiner

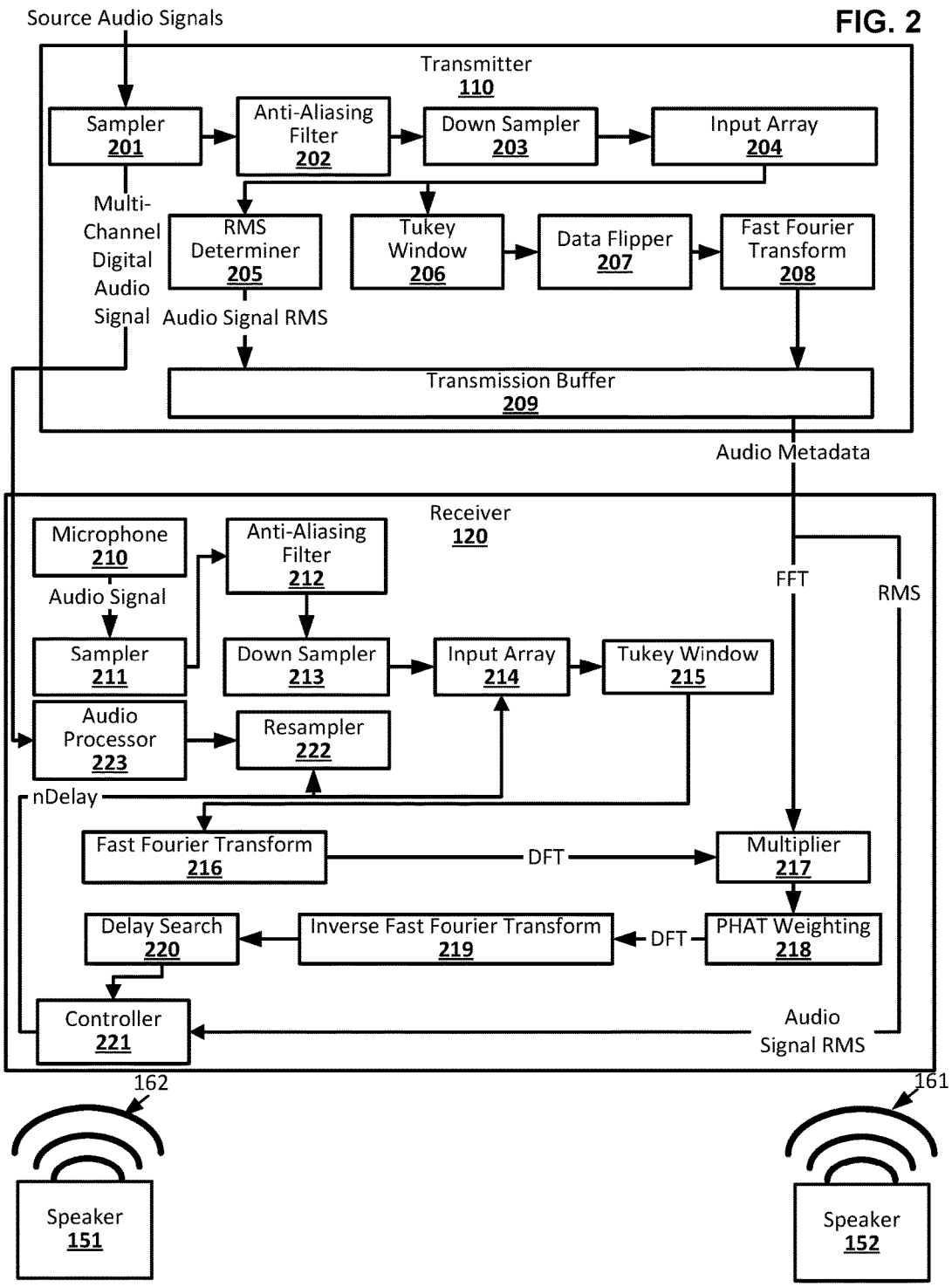

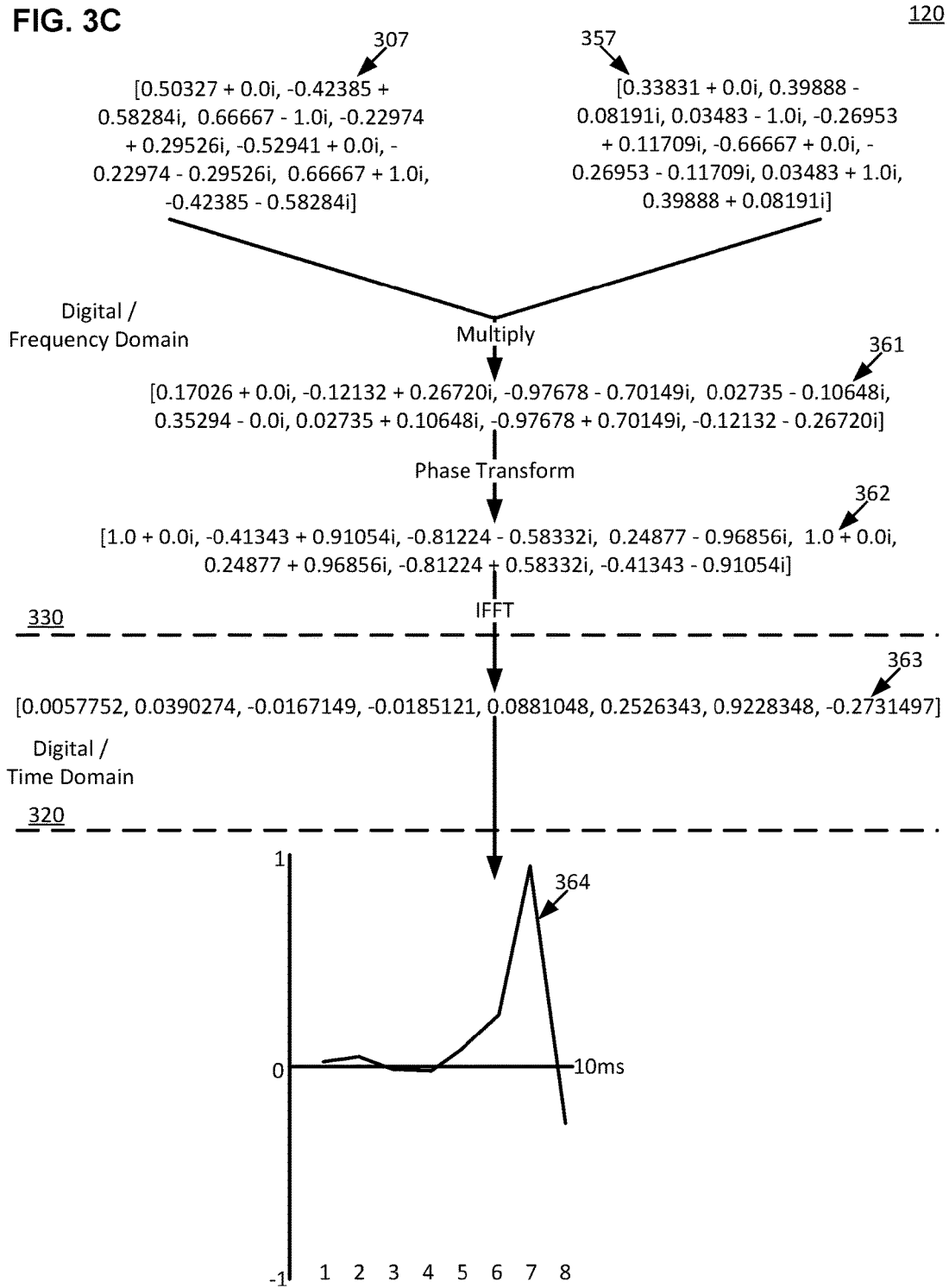

AUDIO SYNCHRONIZATION AND DELAY ESTIMATION

BACKGROUND

The same audio signal can be delivered to both speakers in a venue, and to electronic devices within the venue. The sound produced by the speakers based on the audio signal may arrive at the location of an electronic device within the venue after the audio signal arrives at the electronic device. When the audio signal arriving at the electronic device is used to produce sound based on the audio signal, the sound from the speakers may be delayed compared to the sound produced by the electronic device. If the electronic device is mobile, the size of the delay between the sound from the speakers and the sound from the electronic device may change as the distance between the electronic device and the speakers changes.

BRIEF SUMMARY

According to implementations of the disclosed subject matter, an audio signal may be pre-processed at a transmitter to generate a transmitter pre-processed audio signal including samples including a value and having a position in the transmitter pre-processed audio signal. The positions of the samples of the transmitter pre-processed audio signal may be reversed to generate a reversed audio signal. A transmitter discrete Fourier transform representation may be generated from the reversed audio signal. The transmitter discrete Fourier transform representation may be transmitted from the transmitter to a receiver as audio metadata.

The audio metadata including the transmitter discrete Fourier transform representation may be received at a receiver. A second audio signal may be pre-processed at the receiver. A receiver discrete Fourier transform representation may be generated from the pre-processed second audio signal. A correlation result in a discrete Fourier transform representation may be generated based on an element-wise multiplication of the transmitter discrete Fourier transform representation and the receiver discrete Fourier transform representation. An inverse Fourier transform may be performed on the correlation result in a discrete Fourier transform representation to generate a correlated signal including samples, each sample of the correlated signal having a position in the correlated signal and a value. A relative delay value may be determined based on the position in the correlated signal of a sample comprising a value with the greatest magnitude of the values of the samples of the correlated signal. Playback of a third audio signal may be adjusted by the receiver based on a current delay value adjusted based on the relative delay value.

Systems and techniques disclosed herein may allow for audio synchronization and delay estimation. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 2 shows an example system suitable for audio synchronization and delay estimation according to an implementation of the disclosed subject matter.

FIG. 3C shows an example arrangement suitable for audio synchronization and delay estimation according to an implementation of the disclosed subject matter.

DETAILED DESCRIPTION

Figure 1:
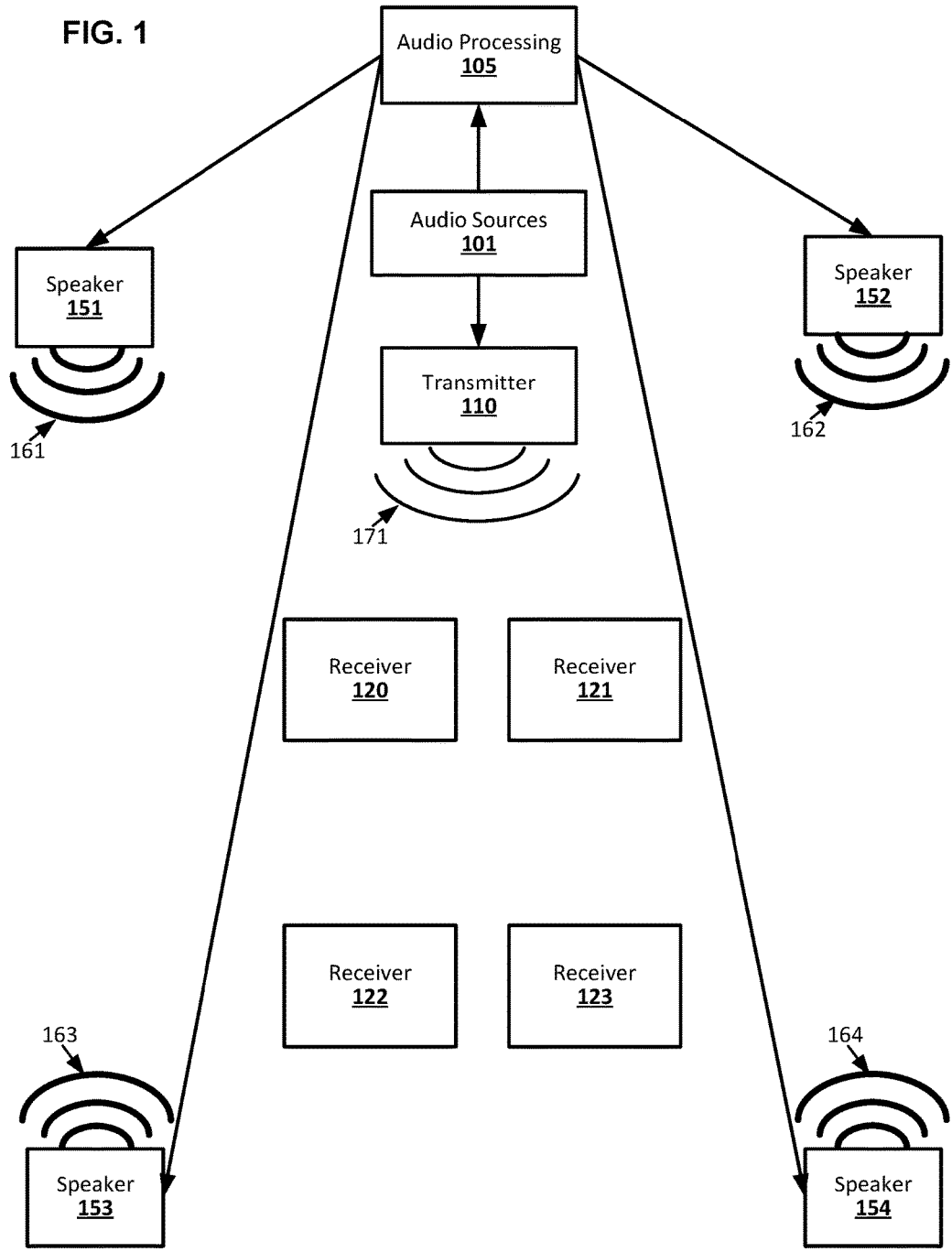
FIG. 1 shows an example system suitable for audio synchronization and delay estimation according to an implementation of the disclosed subject matter.

Audio synchronization and delay estimation may allow for the synchronization at the location of an electronic device of sound produced by the electronic device using a received audio signal with sound produced by speakers located some distance from the electronic device using another received signal from the same original source as the audio signal received at the electronic device. The delay between the audio signal arriving at the electronic device and the sound produced by the speakers arriving at the location of the electronic device may be estimated. The estimated delay may be used to delay production of sound by the electronic device using the received audio signal by slowing down playback of the audio signal. This may result in the sound produced by the electronic device synchronizing with the sound arriving at the location of the electronic device from the speakers, so that a listener at the location of the electronic device doesn't hear the sound from the audio signal being reproduced with an echo.

For example, a person attending a concert may have a personal audio device. The personal audio device may receive an audio signal transmitted wirelessly, for example, using Wi-Fi. The audio signal may be based on source audio signals generated based on sounds or signals from instruments, vocalists, or other audio sources that are part of the concert. For example, sound from instruments may be picked up by microphones on or near the instruments or from pickups attached to the instruments and turned into audio signals, vocals from vocalists may be picked up by microphones and turned into audio signals, and other audio sources, such as, for example, synthesizers, computers, or other electrical or electronic devices, may directly generate audio signals. The various source audio signals may be combined into the audio signal that may be transmitted wirelessly to the personal audio device. The audio signal may, for example, include a separate channel for each source audio signal. The audio signal may be processed, for example, mixed, equalized, and separated into channels based on the number and location of speakers in the venue. The processed audio signal may be transmitted, either through wires or wirelessly, to speakers placed throughout the venue of the concert. For example, if the processed audio signal is separated into channels, each speaker may receive the portion of the processed audio signal corresponding to the channel to be reproduced by that speakers. The speakers may use the processed audio signal to generate sound.

The audio signal may arrive at the personal audio device wirelessly before the sound from the speakers arrives at the location of the personal audio device. If the personal audio device uses the audio signal to produce sound from portions of the audio signal as they arrive, the sound produced by the personal audio device may precede the arrival of equivalent sound from the speakers. For example, the personal audio device may output sound through headphones worn by the person using the personal audio device, who may hear sound through the headphones before hearing the same sound as it arrives from the nearest speakers. In some venues, production of sound by the rear speakers based on the audio signal may be delayed in order to synchronize with sound arriving from the speakers at the front of the venue, further delaying the sound heard by a person near the rear speakers when compared to sound produced by the personal audio device based on the received audio signal. Production of sound by the personal audio device may be delayed to synchronize the sound produced by the personal audio device with the sound arriving at the location of the personal audio device from the nearest speakers.

An audio signal may be generated from any suitable number of source audio signals generated by any suitable number of audio sources. The source audio signals may make up any suitable number of channels. For example, each source audio signal may represent one channel, which may be mono channel, or may be a stereo channel, for example, a left or right channel generated by a stereo pickup. Copies of the source audio signals may be sent to a transmitter and to mixing, equalizing, and amplifying devices. For example, the source audio signals may be transmitted through a wired analog or digital connection which may be physically split using a suitable analog or digital splitter, or may be transmitted wirelessly, through a wireless broadcast using any suitable wireless protocol which may be received by multiple devices, including, for example, the transmitter and the mixer.

The source audio signals received at the mixer may be mixed, for example, setting the relative volumes of each of the channels represented by the source audio signals. The mixer may combine the source audio signals into a mixed audio signal, which may include any suitable number of channels. The mixed audio signal may be analog or digital. For example, the mixer may be a digital mixer, and may covert input analog source audio signals into digital audio signals. The mixed audio signal may be input to the equalizer, which may adjust the volumes of the various sound frequencies in the mixed audio signal. The mixed and equalized audio signal may be input to an amplifier, which may amplify the mixed and equalized audio signal and provide the amplified audio signal to the speakers through-out the venue to be used to generate sound. The mixed and equalized audio signal may include any number of channels, such as, for example, two stereo channels to be sent to speakers located to the left and right of the audio sources, or multiple channels, for example, one channel for each speaker.

The source audio signals received at the transmitter may be processed to generate audio metadata be sent with the audio signal to electronic devices, such as personal audio devices, within the venue. The transmitter may include a computing device and a wireless transmission device. For example, the transmitter may include a computer, such as a laptop, connected to a Wi-Fi router. The computing device may use any suitable combination of hardware and software to implement various signal processing techniques. For example, the computing device may be general purpose computer running signal processing software, or may be a computing device including signal processing hardware used in conjunction with or in place of signal processing software. The source audio signals may be combined into a combined analog audio signal before being input to the computing device, or may be combined by the computing device. The source audio signals may also be sampled separately and combined into a multi-channel digital audio signal, which may, for example, include digital conversions of all of the source audio signals and may preserve channel information for the source audio signals.

The computing device of the transmitter may sample the combined analog audio signal at a suitable sample rate, such as, for example, 48 kHz, and may generate a digital audio signal. The analog audio signal may be sampled continuously as it arrives at the computing device of the transmitter, generating a continuous digital audio signal. For example, the computing device may include an Analog-to-Digital Converter (ADC), which may sample the input analog audio signal to generate a digital audio signal.

The digital audio signal may be filtered and down sampled. For example, the computing device may use an anti-aliasing filter with any suitable parameters to filter portions of the digital audio signal continuously as they are generated from the sampling of the combined analog audio signal. For example, the anti-aliasing filter may use a stop band frequency of 1500 Hz, a ripple of 1 dB, a stop band of −50 dB, and a pass band of 1150 Hz. The anti-aliasing filter may be implemented using any suitable combination of hardware and software. After being processed through the anti-aliasing filter, the filtered digital audio signal may be down sampled any suitable number of times. For example, the filtered digital audio signal may be down sampled by a factor of 16, resulting in a 3 kHz down sampled digital audio signal.

After being down sampled, the down sampled digital audio signal may be stored in an input array. The input array may be, for example, a data structure of any suitable size. For example, the input array may be a 2048 element array, and each element may store one of 2048 samples. The samples stored in the input array may represent any suitable length of the down sampled digital audio signal. For example, the samples stored in the input array may represent 682.7 ms of the down sampled digital audio signal. The input array may be stored on the computing device in any suitable manner, in any suitable storage hardware, including volatile and non-volatile storage. The sampling, filtering and down sampling of the combined analog audio signal may be continuous. For example, the combined analog audio signal may be sampled, filtered with the anti-aliasing filter, and down sampled as it is received at the computing device of the transmitter. The results of the down sampling may be continuously stored in the input array, for example, on a first-in first-out basis, with new samples pushing down older samples and the newest sample causing the oldest sample to exit the input array. The input array may be implemented as a first-in first-out queue using any suitable data structure. The samples stored in the input array may be the result of down sampling. For example, when the input array stores 2048 values, each representing a sample, the input array may represent 682.7 ms of the combined analog audio signal at a sampling rate of 3 kHz, down sampled from 32768 samples representing the same 682.7 ms of the combined analog audio signal at a sampling rate of 48 kHz, as sampled by the computing device on input of the combined analog audio signal.

The down sampled digital audio signal, as stored in the input array, may have its root mean square (RMS) determined. For example, the computing device may calculate the value of the root mean square of the down sampled digital audio signal based on the 2048 values stored in the input array. The value of the root mean square may be stored, for example, in a transmission buffer, and may be part of audio metadata for the portion of the source audio signals, for example, the 682.7 ms of the source audio signals, that were combined, sampled, filtered, and down sampled to produce the down sampled digital audio signal stored in the input array. The value of the root mean square may be determined at intervals, such as for example, at 682.7 ms when the input array is initially filled from continuous sampling of the combined analog audio signal, and once every 500 ms thereafter, reusing samples representing 182.7 ms of the combined analog audio signal that were used in the previous determination of the value of the root mean square.

The down sampled digital audio signal may be windowed. For example, the computing device may window the down sampled digital audio signal from the input array using a Tukey window. The Tukey window may use a number of points matching the size of the input array. For example, the input array may store 2048 samples for the down sampled digital audio signal, and the Tukey window may use 2048 points. The Tukey window may use a ratio of 0.2. The windowed digital audio signal may have its data flipped. For example, the computing device may reverse the order of the individual samples of the windowed digital audio signal through memory mapping. The reversed digital audio signal may be the windowed digital audio signal backwards. The down sampled digital audio signal may be windowed, and the resulting windowed digital audio signal flipped, at intervals, such as, for example, at 682.7 ms initially, and then once every 500 ms, at the same time the value of the root mean square is determined. The reversed digital audio signal and the value of the root mean square may both be determined from the same down sampled digital audio signal represented by, for example, the same elements of the input array sampled from the same portion of the combined analog audio signal received at the transmitter. In some implementations, other window types may be used to window the down sampled digital audio signal.

The reversed digital audio signal may be transformed to the frequency domain using a Fourier transform. For example, the computing device may implement a 2048 point fast Fourier transform (FFT) on the reversed digital audio signal to generate a discrete Fourier transform (DFT) for the reversed digital audio signal. The DFT representation of the reversed digital audio signal may include any suitable number of complex numbers. For example, the DFT representation generated by a 2048 point FFT may include 2048 complex numbers. The DFT representation may be a frequency domain representation of the reversed digital audio signal. The DFT representation may be normalized by dividing each component of each complex number in the DFT representation by the magnitude of the real or imaginary component with the greatest magnitude of any components of any of the complex numbers in the DFT representation. The DFT representation may be stored in the transmission buffer along with the value of the root mean square. In some implementations, only some of the complex numbers of the DFT representation may be stored in the transmission buffer. For example, for a DFT representation with 2048 complex numbers, only the first 1025 complex numbers may be stored in the transmission buffer. The $1^{st}$ and $1025^{th}$ complex numbers may be unique, but the $2^{nd}$ through $1024^{th}$ complex number and $1026^{th}$ through $2048^{th}$ complex number may be mirrored, so that the full DFT representation of 2048 complex numbers may be reconstructed with only the first 1025 complex numbers.

The wireless transmission device may transmit the audio metadata stored in the transmission buffer. For example, the wireless transmission device may use a radio signal of any suitable type, including, for example, a Wi-Fi signal, to transmit the DFT representation, or some subset of the complex numbers of the DFT representation, of the reversed digital audio signal and the value of the root mean square stored in the transmission buffer. The audio metadata may be transmitted along with multi-channel digital audio signal generated from the same section of the source audio signals that was used to generate the audio metadata. For example, the multi-channel digital audio signal, including digital conversions of all of the source audio signals and channel information for the source audio signals for the same 682.7 ms section of the source audio signals that were combined and used to generate the DFT representation and for which the value of the root mean square was determined, may be transmitted along with the audio metadata. The multi-channel digital audio signal and the audio metadata may be transmitted separately using separate wireless communication channels, bandwidth, or frequency. Alternatively, the multi-channel digital audio signal and the audio metadata may be modulated or multiplexed together and transmitted using a single communication channel, bandwidth or frequency. For example, the multi-channel digital audio signal and the audio metadata may be encoded using a Quadrature Amplitude Modulation (QAM) technique, such as 16-bit QAM.

The transmitter may generate and transmit audio metadata at any suitable rate. For example, while the sampling, alias filtering, and down sampling of the combined analog audio signal may be continuous, the audio metadata may be generated initially after 682.7 ms, and then once every 500 ms. The first transmission may not occur until 682.7 ms of the combined analog audio signal have been sampled in order to ensure the input array is filled with samples, after which subsequent audio metadata may be generated and transmitted every 500 ms based on a set of samples that includes some samples used to generate the immediately previous audio metadata. For example, the last 182.7 ms of samples used to generate the previous audio metadata may be used to generate the subsequent audio metadata. The reused samples may remain in the input array to be reused, as they may not yet have been pushed out of the input array.

The transmitted audio metadata and multi-channel digital audio signal may be received at an electronic device. For example, a personal audio device used by a person in the venue may include a wireless communications device, such as, for example, a Wi-Fi radio, which may receive wireless transmissions from the transmission device. The electronic device may generate sound based on the received multi-channel digital audio signal. For example, the personal audio device may include any suitable combination of hardware and software for driving a speaker based on a digital audio signal. Headphones, which may be wired or wireless, may be connected to the personal audio device and may be worn by the person. The electronic device may allow for the manipulation of the multi-channel digital audio signal. For example, the personal audio device may allow the person to adjust the mixing of the channels and equalization of the frequencies in the multi-channel digital audio signal. This may allow, for example, a person to change the relative volumes of instruments and vocals, or emphasize or deemphasize frequencies, in the multi-channel digital audio signal, changing the sound generated by the headphones using the multi-channel digital audio signal. The multi-channel digital audio signal may be buffered or otherwise held in any suitable memory of the electronic device as it is received and before being used to generate sound. This may allow playback of the multi-channel digital audio signal by the electronic device to be delayed or sped up. The amount of time it takes sound generated by speakers based on parts of the same section of the source audio signals as the audio metadata to arrive at the location of the electronic device after the arrival of the multi-channel digital audio converted from the same section of the source audio signals may be determined based on the audio metadata. This amount of time may be a delay between the sound from the speakers and the multi-channel digital audio signal from the transmitter. When the sound generated by the speakers is delayed, only part of the section of the source audio signals may have been used by the speakers to generate sound by the time the entire section of the source audio signals arrives at the electronic device as the multi-channel digital audio signal.

The electronic device may include a microphone. The microphone may generate an analog audio signal based on sounds in the surrounding environment. For example, a microphone on a personal audio device used by a person in a venue may generate an analog audio signal based on sounds in the venue, including, for example, sounds being played over speakers. The sounds being played over the speakers may be generated based on the audio signal sent to the speakers, for example, from the amplifier, and may be based on the copies of the source audio signals that were sent to the mixer.

The analog audio signal generated by the microphone may be sampled by the electronic device at a suitable sample rate, such as, for example, the same sample rate used by the computing device of the transmitter, which may be 48 kHz. The analog audio signal generated by the microphone may be sampled continuously as sound arrives at the location of the electronic device and is converted to an analog audio signal by the microphone. The sampling may generate a continuous digital audio signal. For example, the electronic device may include an Analog-to-Digital Converter (ADC), which may sample the analog audio signal generated by the microphone to generate a digital audio signal.

The digital audio signal may be filtered and down sampled. For example, the electronic device may use an anti-aliasing filter with any suitable parameters to filter the portions of the digital audio signal continuously as they are generated from the sampling of the analog audio signal generated by the microphone. For example, the anti-aliasing filter of the electronic device may use the same parameters as the anti-aliasing filter of the computing device of the transmitter, including a stop band frequency of 1500 Hz, a ripple of 1 dB, a stop band of −50 dB, and a pass band of 1150 Hz. The anti-aliasing filter may be implemented using any suitable combination of hardware and software. After being processed through the anti-aliasing filter, the filtered digital audio signal may be down sampled the same number of times that the filtered digital audio signal generated on the computing device of the transmitter is down sampled. For example, the filtered digital audio signal may be down sampled by a factor of 16, resulting in a 3 kHz down sampled digital audio signal.

After being down sampled, the down sampled digital audio signal may be stored in an input array. The input array may be, for example, a data structure of any suitable size, and may store may data than the input array on the computing device of the transmitter. For example, the input array may be a 3000 element array, and each element may store one of 3000 samples. The samples stored in the input array may represent any suitable length of the audio signal. For example, the samples stored in the input array may represent 1000 ms of the audio signal at 3 kHz. The input array may be stored on the electronic device in any suitable manner, in any suitable storage hardware, including volatile and non-volatile storage. The sampling, filtering and down sampling of the analog audio signal generated by the microphone may be continuous. For example, the analog audio signal generated by the microphone may be sampled, filtered with the anti-aliasing filter, and down sampled as it is generated by the microphone of the electronic device. The results of the down sampling may be continuously stored in the input array, for example, on a first-in first-out basis, with new samples pushing down older samples and the newest sample causing the oldest sample to exit the input array. The input array may be implemented as a first-in first-out queue using any suitable data structure. The samples stored in the input array may be the result of down sampling. For example, when the input array stores 3000 values, each representing a sample, the input array may represent 1000 ms of the analog audio signal generated by the microphone at a sampling rate of 3 kHz, down sampled from 48000 samples representing the same 1000 ms of the analog audio signal generated by the microphone at sampling rate 48 kHz, as sampled by the electronic device from the analog audio signal.

A section of the down sampled digital audio signal may be windowed. For example, the electronic device may window a section of the down sampled audio signal from the input array of the same size as the input array on the computing device of the transmitter using a Tukey window. The Tukey window may use a number of points matching the size of the section of the down sampled audio signal from the input array, which may be the same number of points used by the Tukey window on the computing device of the transmitter. For example, the input array may store 3000 samples of the down sampled digital audio signal with 2048 samples being windowed, and the Tukey window may use 2048 points. The Tukey window may use a ratio of 0.2. The down sampled digital audio may be windowed at intervals. The windowing of the down sampled digital audio signal from the input array may coincide with the receiving at the electronic device of a section of specified length of the multi-channel digital audio signal. For example, once the electronic device beings receiving the multi-channel digital audio signal, the first windowing of the down sampled digital audio in the input array may occur after a 682.7 ms section of the multi-channel digital audio, and accompanying audio metadata, is received, which may be after 682.7 ms, as the multi-channel digital audio signal may be streamed in real time. Subsequent windowing may occur every 500 ms, after the receiving of 500 ms of the multi-channel digital audio signal and audio metadata for the 500 ms of the source audio signals on which the multi-channel digital audio signal is based and for the immediately previous 182.7 ms of the source audio signals. The section of the down sampled audio signal from the input array that is windowed may be selected based on a current delay, for example, as determined using a histogram. For example, if the current delay is 160 ms, the 2048 sample, 682.7 ms, section of the down sampled audio signal from the input array may start at 157.3 ms into the input array, which may store 1000 ms worth of samples, and may end at 840 ms into the input array. The current delay may be set to any suitable value initially, such as, for example, 0 ms, or a value based on a known distance between the electronic device and a speaker.

The windowed digital audio signal may be transformed to the frequency domain using a Fourier transform. For example, the electronic device may implement a 2048 point fast Fourier transform (FFT) on the windowed digital audio signal to generate a DFT representation of the windowed digital audio signal. The DFT representation of the windowed digital audio signal may include any suitable number of complex numbers. For example, the DFT representation generated by a 2048 point FFT may include 2048 complex numbers. The DFT representation may be a frequency domain representation of the windowed digital audio signal. The DFT representation of the windowed digital audio signal may be normalized, for example, in the same manner as the DFT representation of the reversed digital audio signal on the computing device of the transmitter.

The DFT representation of the windowed digital audio signal may be multiplied by the DFT representation of the reversed digital audio signal received as part of the audio metadata. For example, the electronic device may implement an element-wise multiplication of the DFT representation of the windowed digital audio signal and the DFT representation of the reversed digital audio signal, resulting in a correlation result in the DFT representation. The multiplication of the DFT representations may correspond to a convolution of the time domain representations used to generate the DFT representations, for example, the values of the input array of the electronic device and the reversed values of the input array of the computing device of the transmitter for the windowed digital audio signal and the reversed digital audio signal.

The correlation result in the DFT representation may be phase transformed. For example, phase transform (PHAT) weighting may be applied to the correlation result in the DFT representation by the electronic device. The PHAT weighting may divide each complex number of the correlation result in the DFT representation by its own absolute value. The frequencies represented in the resulting PHAT weighted DFT representation may have their amplitudes set to 1 by the PHAT weighting, while phase data for each of the frequencies may be maintained.

The PHAT weighted DFT representation may be transformed to the time domain. For example, the electronic device may implement an inverse FFT on the PHAT weighted DFT representation. The inverse FFT may generate any suitable number of samples for the time domain representation of the PHAT weighted DFT representation. For example, the inverse FFT may generate a number of samples corresponding to the number of samples in the input arrays of the electronic device and the computing device of the transmitter, such as 2048 samples. The time domain representation of the PHAT weighted DFT representation may represent an audio signal that would be the result of convolving the windowed digital audio signal and the reversed digital audio signal with amplitude information removed.

The time domain representation of the PHAT weighted DFT representation may be searched for the sample with the greatest amplitude. For example, the electronic device may perform any suitable search on the values of the samples of the time domain representation of the PHAT weighted DFT representation to determine which sample has the highest value, indicating the greatest amplitude. The position of the sample with the greatest amplitude may indicate the amount by which the analog audio signal generated by the microphone of the electronic device, and the sound from the speakers, is delayed compared to the multi-channel digital audio signal received from the transmitter, relative to a previously determined delay value. For example, if the sample with the greatest amplitude is the first or last sample of the time domain representation of the PHAT weighted DFT representation, this may indicate that there is no delay relative to the current delay value. For example, if the sample with the greatest amplitude is the last sample of the time domain representation of the PHAT weighted DFT representation the relative delay may be 0 ms. The value of the relative delay may be determined based on the location of the sample greatest amplitude. For example, if the sample with the greatest amplitude is located after the $1^{st}$ sample and before the middle sample, for example, the $1024^{th}$ sample, the relative delay may be positive. Otherwise, if the sample with the greatest amplitude is located after the middle sample, the relative delay may be negative. The magnitude of the relative delay may increase as the sample with the greatest amplitude approaches the middle sample of the time domain representation of the PHAT weighted DFT representation. For example, the relative delay value may be determined according to, for $1 \geq x \geq S/2$, $(x-1)/F$, and for $S/2 \geq x \geq S$, $(x-S)/F$, where S is the total number of samples in the time domain representation of the PHAT weighted DFT representation, x is the sample number of the sample with the greatest amplitude, and F is the sampling frequency in Hz of the time domain representation of the PHAT weighted DFT representation. If the domain representation includes more than one sample with the greatest amplitude, any sample with the greatest amplitude may be chosen to determine the relative delay.

The value of the relative delay may be added to a histogram. For example, the electronic device may include a controller which may control the output of the multi-channel digital audio signal from the electronic device to a sound generating device, such as headphones connected to a personal audio device. The histogram may include any suitable number of bins, and each bin may represent a range of delay values, for example, in milliseconds. For example, the histogram may use an interval of 4 ms, and may have enough bins to represent the entire length of the section of the source audio signals represented by the audio metadata. The histogram may, for example, have 395 bins of 4 ms each, starting with a bin representing a delay of −80 ms to −76 ms, and ending with a bin representing a delay of 1496 ms to 1500 ms. The value of the relative delay may be weighted in any suitable manner before being added to the histogram. For example, the value of the relative delay may be weighted according to the value of the root mean square from the audio metadata. The value of the relative delay may be weighted to 0, and therefore discarded, if the value of the root means square from the audio metadata is less than 300, weighted to 1 if the value of the root mean square is 300 to 2000, and weighted to 2 if the value of the root mean square is above 2000. Discarded relative delay values may have been determined based on sections of the source audio signals which contain little or no sound, resulting in a very low root mean square value and indicating a lack of activity from the audio sources.

Any suitable number of relative delay values may be used in the histogram. For example, the histogram may use 26 relative delay values, which may be replaced on a first-in first-out basis. The values of the relative delays used in the histogram may be weighted for recency. For example, the histogram may use 26 relative delay values, with the 13 most recent relative delay values weighted by a factor of 2 in addition to any weighting of those relative delay values based on the values of their corresponding root mean squares, and the 13 oldest relative delay values may be weighted by a factor of 1. For example, the most recent value for a relative delay to enter the histogram may have a corresponding root mean square of 2500, resulting in the value for the relative delay being weighted by a factor of 4. The histogram may also use any other suitable weightings for relative delay values. When a relative delay value is added to the histogram, the count for the bin of the histogram corresponding to the relative delay value may be increased according to the weighting of the relative delay. For example, the most recent value for a relative delay to enter the histogram may be 2.5 ms, and may have a weighting of 4, resulting in the count for the 0 ms to 4 ms bin of the histogram increasing by 4. As new relative delay values enter the histogram, counts from the oldest relative delay value, which falls out of the histogram, may be removed from the appropriate bin, and changes in recency weightings may result in changes to the counts of any bins of the histogram.

The current delay may be adjusted based on the histogram. For example, the electronic device may determine an adjustment to the current delay based on the counts for the various bins of the histogram and the delay values to which the bins correspond. The adjustment to the current delay may be determined in any suitable manner. For example, the histogram bin with the highest count may be used as the adjustment to the current delay, based on, for example, the average delay represented by that histogram bin. For example, a histogram may have a count of 16 in the 0 ms to 4 ms bin, a count of 28 in the 4 ms to 8 ms bin, a count of 10 in the 8 ms to 12 ms bin, and a count 6 in the 12 ms to 16 ms bin. The adjustment to the current delay may be 6 ms, which may be the average delay of the 4 ms to 8 ms bin, which may have the highest count. If the current delay was, for example, 40 ms, the current delay may be adjusted by 6 ms, to 46 ms. The current delay may also be adjusted downwards, for example, if a bin representing a negative relative delay has the highest count. For example, if the current delay is 40 ms, and a bin representing a delay from −8 ms to −4 ms has the highest count, the current delay may be adjusted downwards by 6 ms, to 34 ms, based on the average of −6 ms of the bin with the highest count.

The current delay, as adjusted based on the adjustment determined by the histogram, may be used to adjust the data from the input array of the electronic device used when determining the next relative delay value. For example, the input array may store 3000 samples, of which 2048 samples may be used to determine a relative delay value. The oldest sample, for example, the $3000^{th}$ sample of the input array may represent 0 ms, and the new samples, for example, the $1^{st}$ sample of the input array, may represent 1000 ms. The samples in the input array may represent a total of 1000 ms of audio signal. When determining the next relative delay value, the samples windowed using the Tukey window may be samples starting at the current delay value and going up to 682.7 ms from the current delay value. For example, if the current delay value is 0 ms, which it may be initially, the samples from the input array that are windowed may be from 0 ms, which may be the oldest sample in the input array, for example, the $3000^{th}$ sample, to 682.7 ms, which may be the $1053^{rd}$ sample, for a total of 2048 samples. If the current delay value is 160 ms, the samples that are windowed may be from 160 ms, which may be the $2520^{th}$ sample, to 842.7 ms, which may be the $473^{rd}$ sample. This may allow the relative delay value to be determined relative to the current delay value as adjusted based on the histogram.

The current delay may be used to adjust the generation of sound by the electronic device based on the multi-channel digital audio signal received from the transmitter. For example, the current delay may indicate the amount of time by which the multi-channel digital audio signal from the transmitter is ahead of the analog audio signal being generated by the microphone based on sound from the speakers. To synchronize the sound a person using the electronic device hears from the speakers with the sound the person would hear using headphones connected to the electronic device, a digital audio signal based on the multi-channel digital audio signal from the transmitter, which is used to generate sound through the headphones, may be delayed, or sped up, according to the current delay.

For example, the current delay may be output to an audio asynchronous resampler. The audio asynchronous resampler may, for example, resample a stereo digital audio signal generated from the multi-channel digital audio signal received from the transmitter before the stereo digital audio signal is used to generate sound. The resampling may slow down the playback of the stereo digital audio signal, for example, duplicating samples, in order to increase the amount of time over which a section of the stereo digital audio signal is used to generate sound. This may cause an increase in playback time for a section of the stereo digital audio signal, for example, causing a section that originally represented 100 ms of audio to take 102 ms to playback, implementing a delay of 2 ms. The audio asynchronous resampler may implement resampling to delay the playback of the digital audio signal generated from the multi-channel digital audio signal in any suitable manner, and over any suitable period of time. The audio asynchronous resampler may avoid implementing too great of a delay over too short of a period of time, as the resampling may cause audio artifacts or noticeable changes in pitch in the generated sound. The audio asynchronous resampler may also speed up the playback of the multi-channel digital audio signal, for example, dropping samples, and may also avoid implementing to great of a speed up over too short of a time period.

The current delay may be the total delay needed at the time the current delay is determined, and previous delays implemented by the audio asynchronous resampler may count toward this total. For example, the first current delay determined at the electronic device may be 10 ms. The audio asynchronous resampler may have delayed playback of the stereo digital audio signal by 5 ms when the current delay is adjusted to 9 ms. Because playback of the stereo digital audio signal is already delayed by 5 ms, the audio asynchronous resampler may only delay playback of the stereo digital audio signal by an additional 4 ms, bringing the total delay to 9 ms, matching the current delay. If the next current delay is not 9 ms, for example, is 7 ms or 10 ms, the audio asynchronous resampler may delay or speed up playback of the stereo digital audio signal accordingly, for example, implementing a 2 ms speed up to bring the total delay to 7 ms, or implementing an additional 1 ms delay to bring the delay to 10 ms. The current delay may change, for example, due to a person moving and changing the distance between the microphone of the electronic device and the nearest speaker, or due to changes in the transmission environment for the transmitter. When the total delay matches the most recent current delay, the audio asynchronous resampler may allow the digital audio signal generated from the multi-channel digital audio signal, for example, the stereo audio signal, to play back without delays or speedups.

The transmitter may be aware of the distance between the transmitter and the closest speaker. The transmitter may use this distance to determine a delay used in transmitting the multi-channel digital audio signal and audio metadata. This may reduce the delays, and the average delay, determined by the electronic device, and may allow for the sound generated by the electronic device to be synchronized with the sound generated by the nearest speaker more quickly. In some implementations, there may be multiple transmitters in a venue. Each transmitter may be aware of the distance between itself and the front of house speaker that would be closet to people within range of the transmitter, and may use this distance to implement a delay in transmitting the multi-channel digital audio signal and the audio metadata.

Any suitable timing data may be used by the transmitter and electronic device to ensure that the appropriate section of the analog audio signal generated by the microphone is used to generated the DFT representation on the electronic device that is multiplied with the DFT representation of the reversed digital audio signal received as part of the audio metadata. The multi-channel digital audio signal from the transmitter may be streamed continuously to the electronic device, as the audio sources may be live.

In some implementations, the audio sources may generate digital audio signals. The digital source audio signals may not need to be initially sampled by the transmitter, as they may already be digitally sampled. The digital source audio signals may still be combined and down sampled before being filtered.

In some implementations, the microphone of the electronic device may be a digital microphone that generates digital audio signals. The digital audio signal generated by the microphone may not need to be initially sampled, as it may already be digitally sampled. The digital audio signal may still be down sampled before being filtered.

The discrete Fourier transform representations may be in any suitable format, and may use complex numbers, polar notation, or any other suitable representation type.

The computing device of the transmitter and the receiver may each use any suitable combination of general and special purpose hardware and software for signal processing. For example, the computing device may use general purpose central processing units (CPUs), graphics processing units (GPUs), other special-purpose processors which may run software for implementing various signal processing techniques, dedicated hardware such as ADCs, digital to analog converters (DACs) hardware filters, field programmable gate arrays (FPGAs), or other special-purpose hardware.

FIG. 1 shows an example system suitable for audio synchronization and delay estimation according to an implementation of the disclosed subject matter. A venue may be any environment in which audio is played back, for example, from live sources, for an audience. The venue may include audio sources 101, audio processing 105, a transmitter 110, and speakers 151, 152, 153, and 154. The receivers 120, 121, 122, and 123 may be electronic devices used by persons within the venue, such as, for example, as personal audio devices.

The audio sources 101 may be any suitable sources of audio signals. For example, the audio sources 101 may include any number of microphones or pickups to convert sound from instruments or vocalists to analog audio signals. The audio sources 101 may include any number of synthesizers, computing devices, or other electric or electronic devices which may generate audio signals directly and which may not generate sound without a speaker. The analog audio signals from the audio sources 101 may be source audio signals, and may be sent to the audio processing 101 and the transmitter 110. For example, the source audio signals may be split using a suitable analog or digital splitter.

The transmitter 110 may be any suitable device or devices for processing audio signals and transmitting data, including processed audio signals, wirelessly. For example, the transmitter 110 may include a computing device, such as, for example, a desktop, laptop, tablet, smartphone, or local or remote server, that may include software and hardware for processing digital audio signals. The computing device may be able to receive analog audio signals, such as the separate or combined source audio signals from the audio sources 101, as input. The transmitter 110 may also include a transmission device. The transmission device may be any suitable device for the wireless transmission of data over distances, and may be, for example, a standalone wireless router or access point connected to the computing device through any suitable wired or wireless connection, or may be a component of the computing device, such as a wireless card with any suitable wireless radio. The transmission device may use any suitable type of wireless communication, such as, for example Wi-Fi, Bluetooth, analog radio, or digital radio. The transmission device may have any suitable range. For example, a single transmission device may have sufficient range to transmit data to any part of a venue, or may only be able to cover a portion of the venue. The number of transmission devices within a venue may be based on the size of the venue and the range of the transmission devices. In some implementations, the transmitter 110 may include multiple transmission devices connected to a computing devices. In some implementations, multiple transmitters such as the transmitter 110, including computing devices and transmission devices, may be distributed throughout the venue and may be connected to the source audio signals.

The transmitter 110 may transmit the wireless signal 171. The wireless signal 171 may, for example, be a wireless broadcast signal according to the wireless communication protocol used by the transmission device of the transmitter 110. The wireless signal 171 may carry data that includes the multi-channel digital audio signal generated from the source audio signals and audio metadata generated by the computing device of the transmitter 110.

The audio processing 105 may include any suitable number and arrangement of any suitable components for processing audio signals, implemented in any suitable manner. For example, the audio processing 105 may include a mixer, an equalizer, and an amplifier. The source audio signals received at the mixer may be mixed, for example, setting the relative volumes of each of the channels represented by the source audio signals. The mixer may combine the source audio signals from the audio sources 101 into a mixed audio signal, which may include any suitable number of channels.

The mixed audio signal may be analog or digital. For example, the mixer may be a digital mixer, and may covert input analog source audio signals into digital audio signals. The mixed audio signal may be input to the equalizer, which may adjust the volumes of the various sound frequencies in the mixed audio signal. The mixed and equalized audio signal may be input to an amplifier, which may amplify the audio signal and provide the amplified audio signal from the audio processing 105 to the speakers 151, 152, 153, and 154 throughout the venue to be used to generate sound. For example, the speaker 151 may generate sound wave 161, the speaker 152 may generate sound wave 162, the speaker 153 may generate sound wave 163, and the speaker 154 may generate sound wave 164, based on the amplified audio signal provided by audio processing 105.

The source audio signals received at the transmitter 110 may be processed to generate audio metadata be sent with a multi-channel digital audio signal to the receivers 120, 121, 122, and 123, within the venue. For example, the computing device of the transmitter 110 may generate the multi-channel digital audio signal and the audio metadata from the source audio signals. The multi-channel digital audio signal and the audio metadata may be transmitted as data carried by the wireless signal 171.

The receivers 120, 121, 122, and 123 may be any suitable electronic devices for receiving the wireless signal 171 and for generating sound using the multi-channel digital audio signal from the wireless signal 171. For example, the receivers 120, 121, 122, and 123 may be personal audio devices, such as smartphones, tablets, or dedicated audio players, used by persons in the venue, and may include a wireless communications device, such as, for example, a Wi-Fi radio, for receiving the wireless signal 171 and for communicating wirelessly with the transmitter 110. The receivers 120, 121, 122, and 123 may generate sound based on the received multi-channel digital audio signal. For example, the receivers 120, 121, 122, and 123 may include any suitable combination of hardware and software for driving a speaker based on a digital audio signal. Headphones, which may be wired or wireless, may be connected to the receivers 120, 121, 122, and 123 and may be worn by persons using the receivers 120, 121, 122, and 123. The receivers 120, 121, 122, and 123 may allow persons using them to manipulate the multi-channel digital audio signal. For example, the person may be able to adjust the mixing of the channels and equalization of the frequencies in the multi-channel digital audio signal on their one of the receivers 120, 121, 122, and 123. This may allow, for example, each of the persons to change the relative volumes of instruments and vocals, or emphasize or deemphasize frequencies, in the multi-channel digital audio signal, changing the sound generated by the headphones connected to their one of the receivers 120, 121, 122, and 123 using the multi-channel digital audio signal. The multi-channel digital audio signal may be buffered or otherwise held in any suitable memory of the receivers 120, 121, 122, and 123 as it is received, for example, through the wireless signal 171, and before the multi-channel digital audio signal is used to generate sound. This may allow each of the receivers 120, 121, 122, and 123 to speed up or delay playback of the multi-channel digital audio independently of each other.

Each of the each of the receivers 120, 121, 122, and 123 may determine its own delay. The delay for an individual one of the receivers 120, 121, 122, and 123 may be, for example, the amount of time it takes one of the sound waves 161, 162, 163, or 164 generated by the one of the speakers 151, 152, 153, and 154 and based on the same section of the source audio signals as audio metadata, to arrive at the location of the receiver after the arrival of the multi-channel digital audio converted from the same section of the source audio signals may be determined based on the audio metadata. The sound wave for which the delay is determined may be, for example, the loudest sound wave at the location of the receiver, which may, for example, be generated by the nearest speaker. For example, the receiver 120 may be nearest to the speaker 151, and the sound wave 161 may arrive at the location of the receiver 120 before any other sound wave from any other speaker in the venue and may be loudest sound wave at the location of the receiver 120. The delay determined by the receiver 120 may be based on the sound wave 161. In some instances, the loudest sound wave at the location of a receiver may not be generated by the nearest speaker, for example, due to obstructions. The locations of the receivers 120, 121, 122, and 123 may change as the persons using them move around the venue, changing which of the sound waves 161, 162, 163, and 164 is loudest at the location of each of the receivers 120, 121, 122, and 123.

FIG. 2 shows an example system suitable for audio synchronization and delay estimation according to an implementation of the disclosed subject matter. The transmitter 110 may include a computing device and a transmission device, which may include hardware and software components for the processing of audio signals and the transmission of data. The transmitter may include a sampler 201. The sampler 201 may be any suitable combination of hardware and software for sampling an analog audio signal to generate a digital audio signal, such as, for example, an ADC or multiple ADCs. The sampler 201 may sample the source audio signals, which may be analog signals generated by the audio sources 101. For example, the sampler 201 may sample the source audio signals, which may be, for example, combined into a combined analog signal, at 48 kHz, and may generate a digital audio signal. The combined analog audio signal may be sampled continuously as it arrives at the sampler 201 from the audio sources 101, generating a continuous digital audio signal. The sampler 201 may be able to process multiple channels, for example, through a multi-channel ADC or through multiple ADCs. For example, in addition to generating the digital audio signal from the combined analog signal, the sampler 201 may continuously generate a multi-channel digital audio signal, which may include a separate channel for each of the source audio signals, and may be sampled at any suitable rate. In some implementations, the sampler 201 may include a separate ADC for each of the source audio signals, and may combine the digital conversions of the source audio signals into a single digital audio signal. The sampler 201 may be a component of the computing device of the transmitter 110.

The transmitter 110 may include an anti-aliasing filter 202. The anti-aliasing filter 202 may be any suitable combination of hardware and software for filtering a digital audio signal. The anti-aliasing filter 202 may be, for example, a hardware filter, or a software-implemented filter. The sampler 201 may output the digital audio signal converted from the combined analog audio signal to the anti-aliasing filter 202. The anti-aliasing filter 202 may filter the digital audio signal with any suitable parameters to filter portions of the digital audio signal continuously as they are generated by the sampler 201. For example, the anti-aliasing filter 202 may use a stop band frequency of 1500 Hz, a ripple of 1 dB, a stop band of −50 dB, and a pass band of 1150 Hz. The anti-aliasing filter 202 may continuously filter the digital audio signal and continuously output a filtered digital audio signal. The anti-aliasing filter 202 may be a component of the computing device of the transmitter 110.

The transmitter 110 may include a down sampler 203. The down sampler 203 may be any suitable combination of hardware and software for down sampling a digital audio signal. The down sampler 203 may be, for example, a hardware or software-implemented down sampler. The anti-aliasing filter 202 may output the filtered digital audio signal to the down sampler 203. The down sampler 203 may down sample the filtered digital audio signal any suitable number of times. For example, the filtered digital audio signal may be down sampled by a factor of 16, resulting in a 3 kHz down sampled digital audio signal. The down sampler 203 may continuously down sample continuous input from the anti-aliasing filter 202 and continuously output the down sampled digital audio signal. The down sampler 203 may be a component of the computing device of the transmitter 110.

The transmitter 110 may include an input array. The input array 204 may be implemented in storage of the computing device of the transmitter 110 using a data structure of any suitable size. For example, the input array 204 may be a 2048 element array, and each element may store one of 2048 samples. The samples stored in the input array 204 may represent any suitable length of the down sampled digital audio signal. For example, the samples stored in the input array may represent 682.7 ms of the down sampled digital audio signal. The input array 204 may be stored on the computing device in any suitable manner, in any suitable storage hardware, including volatile and non-volatile storage. The down sampled digital audio signal continuously output from the down sampler 203 may be continuously stored in the input array 204, for example, on a first-in first-out basis, with new samples pushing down older samples and the newest sample causing the oldest sample to exit the input array 204. The input array 204 may be implemented as a first-in first-out queue. When the input array 204 stores 2048 values, each representing a sample, the input array 204 may represent 682.7 ms of the combined analog audio signal at a sampling rate of 3 kHz, down sampled by the down sampler 203 from 32768 samples representing the same 682.7 ms of the combined analog audio signal at a sampling rate of 48 kHz as sampled by the sampler 201. Samples stored in the input array 204 for the down sampled digital audio signal may be output, or accessed, at specified intervals.

The transmitter 110 may include an RMS determiner 205. The RMS determiner 205 may be any suitable combination of hardware and software for determining the RMS a digital audio signal. The RMS determiner 205 may be, for example, implemented as a hardware device, or may be implemented in software on the computing device of the transmitter 110. The RMS determiner 205 may determine the RMS of the down sampled digital audio signal, as stored in the input array 204. For example, the RMS determiner 205 calculate the value of the RMS of the down sampled digital audio signal based on the 2048 values stored in the input array 204. The value of the RMS may be determined at intervals, such as for example, at 682.7 ms when the input array 204 is initially filled with the down sampled digital audio signal output from the down sampler 203, and once every 500 ms thereafter, reusing samples representing 182.7 ms of samples from the input array 204 that were used in the previous determination of the value of the RMS. The RMS determiner 205 may, for example, access the samples stored in the input array 204, or may wait and be sent the samples stored in the input array 204, at the appropriate intervals. The value of the RMS may be output by the RMS determiner 205 to be stored, for example, in a transmission buffer 209, and may be part of audio metadata for the portion of the source audio signals, for example, the 682.7 ms of the source audio signals, that were combined, sampled, filtered, and down sampled to produce the down sampled digital audio signal stored in the input array 204. The RMS determiner 205 may be a component of the computing device of the transmitter 110.

The transmitter 110 may include Tukey window 206. The Tukey window 206 may be any suitable combination of hardware and software for windowing a digital audio signal. The Tukey window 206 may be, for example, implemented as a hardware device, or may be implemented in software on the computing device of the transmitter 110. The Tukey window 206 may be used to window the down sampled digital audio signal from the input array 204. The Tukey window 206 may use a number of points matching the size of the input array 204. For example, the input array 204 may store 2048 samples for the down sampled digital audio signal, and the Tukey window 206 may use 2048 points. The Tukey window 206 may use a ratio of 0.2. The Tukey window 206 may window the digital audio signal at specified intervals, such as for example, at 682.7 ms when the input array 204 is initially filled with the down sampled digital audio signal output from the down sampler 203, and once every 500 ms thereafter, reusing samples representing 182.7 ms of samples from the input array 204 that were previously windowed by the Tukey window 206. The Tukey window 206 may operate in synchronization with the RMS determiner 205, so that the both the Tukey window 206 and the RMS determiner 205 use the same data from the input array 204, for example, representing the same section of the source audio signals. The Tukey window 206 may output a windowed digital audio signal. The Tukey window 206 may be a component of the computing device of the transmitter 110.

The transmitter 110 may include a data flipper 207. The data flipper 207 may be any suitable combination of hardware and software for flipping the data for a digital audio signal. The data flipper 207 may be, for example, implemented as a hardware device, or may be implemented in software on the computing device of the transmitter 110, and may be, for example, instructions for memory mapping. The data flipper 207 may be used to flip the windowed digital audio signal output by the Tukey window 206. The data flipper 207 may reverse the order of the individual samples of the windowed digital audio signal, for example, through memory mapping. The data flipper 207 may output a reversed digital audio signal. The reversed digital audio signal may be the windowed digital audio signal backwards. The data flipper 207 may be a component of the computing device of the transmitter 110.

The transmitter 110 may include a fast Fourier transform 208. The fast Fourier transform 208 may be any suitable combination of hardware and software for performing an FFT on a digital audio signal to generate a DFT for the digital audio signal. The fast Fourier transform 208 may be, for example, implemented as a hardware device, or may be implemented in software, such as signal processing software, on the computing device of the transmitter 110. The fast Fourier transform 208 may transform the reversed digital audio signal output by the data flipper 207 to the frequency domain using a Fourier transform. For example, the fast Fourier transform 208 may implement a 2048 point FFT on the reversed digital audio signal, generating a DFT representation of the reversed digital audio signal. The reversed digital audio signal may be zero-padded. The DFT representation of the reversed digital audio signal may include any suitable number of complex numbers. For example, the DFT representation generated by a 2048 point FFT may include 2048 complex numbers. The DFT representation may be a frequency domain representation of the reversed digital audio signal. The fast Fourier transform 208 may output the DFT representation, or section of the DFT representation, to be stored in the transmission buffer 209 along with the value of the root mean square out by the RMS determiner 205. The DFT representation may be normalized by dividing each component of each complex number in the DFT representation by the magnitude of the real or imaginary component with the greatest magnitude of any components of any of the complex numbers in the DFT representation. The fast Fourier transform 208 may generate the DFT representation at the same intervals that the Tukey window 206 windows the down sampled digital audio signal in the input array 204 and the data flipper 207 generates the reversed digital audio signal, for example, after 682.7 ms initially, and then every 500 ms thereafter. The fast Fourier transform 208 may be a component of the computing device of the transmitter 110.

The transmitter 110 may include the transmission buffer 209. The transmission buffer 209 may be any suitable combination of hardware and software for storing audio metadata before the audio metadata is transmitted by the transmission device of the transmitter 110. The transmission buffer may be, for example, any suitable data structure stored in any suitable volatile or non-volatile storage of the computing device or the transmission device of the transmitter 110. The transmission buffer 209 may receive and store the value of the root mean square output by the RMS determiner 205 and the DFT representation, or section of the DFT representation, of the reversed digital audio signal generated using the fast Fourier transform 208. The value of the root mean square output and the DFT representation of the reversed digital audio signal may be received at the transmission buffer at specified intervals, for example, initially after 682.7 ms plus the processing time needed to generate them, and then every 500 ms thereafter. The value of the root mean square and the DFT representation of the reversed digital audio signal stored in the transmission buffer 209 at a given time may have been determined from the same section of the source audio signals, and may represent audio metadata for that section of the source audio signals. The transmission buffer 209 may be a component of the computing device or the transmission device of the transmitter 110.

The transmission device of the transmitter 110 may transmit the audio metadata stored in the transmission buffer 209, for example, using the wireless signal 171. The wireless signal 171 may be a radio signal of any suitable type, including, for example, a Wi-Fi signal, and may carry the DFT representation of the reversed digital audio signal and the value of the root mean square that were stored in the transmission buffer 209. The audio metadata may be transmitted along with multi-channel digital audio signal generated from the same section of the source audio signals that was used to generate the audio metadata. For example, the multi-channel digital audio signal, output from the sampler 201, and including digital conversions of all of the source audio signals and channel information for the source audio signals for the same 682.7 ms section of the source audio signals that were combined and used to generate the DFT representation and for which the value of the root mean square was determined, may be transmitted along with the audio metadata. The multi-channel digital audio signal and the audio metadata may be transmitted separately using separate wireless communication channels, bandwidth, or frequency. Alternatively, the multi-channel digital audio signal and the audio metadata may be modulated or multiplexed together and transmitted using a single communication channel, bandwidth or frequency. For example, the multi-channel digital audio signal and the audio metadata may be encoded using a Quadrature Amplitude Modulation (QAM) technique, such as 16-bit QAM.

The audio metadata may be generated, stored in the transmission buffer 209, and transmitted at any suitable rate. For example, while the sampling, alias filtering, and down sampling of the combined analog audio signal may be continuous, the audio metadata may be generated initially after 682.7 ms, and then once every 500 ms. The first transmission may not occur until after 682.7 ms of the combined analog audio signal have been sampled in order to ensure the input array 204 is filled with samples, after which subsequent audio metadata may be generated and transmitted every 500 ms based on a set of samples that includes some samples used to generate the immediately previous audio metadata. For example, the last 182.7 ms of samples used to generate the previous audio metadata may be used to generate the subsequent audio metadata. The reused samples may remain in the input array 204 to be reused, as they may not yet have been pushed out of the input array.

The receiver 120 may receive the audio metadata and multi-channel digital audio signal from the transmitter 110. For example, the receiver 120 may receive the wireless signal 171, which may carry the audio metadata from the transmission buffer 209 and the multi-channel digital audio signal output by the sampler 201. The receiver 120 may generate sound based on the received multi-channel digital audio signal. The receiver 120 may allow for the manipulation of the multi-channel digital audio signal, including mixing and equalization of the multi-channel digital audio, using any suitable interface, such as, for example, a touchscreen, or other input devices. The multi-channel digital audio signal may be buffered or otherwise held in any suitable memory of the receiver 120 as it is received and before being used to generate sound. This may allow playback of the multi-channel digital audio signal by the receiver 120 to be delayed or sped up.

The receiver 120 may include a microphone 210. The microphone 210 may be any suitable hardware device for generating an analog audio signal based on based on sounds in the surrounding environment. The microphone 210 may generate an analog audio signal based on sounds, such as the sound waves 161, 162, 163, and 164, from the speakers 151, 152, 153, and 154. The sound waves 161, 162, 163, and 164 from the speakers 151, 152, 153, and 154 may be generated based on the audio signal sent to the speakers 151, 152, 153, and 154, for example, from the amplifier of the audio processing 105, and may be based on the copies of the source audio signals that were sent to the mixer of the audio processing 105 from the audio sources 101. The loudest components of the analog sound signal generated by the microphone 210 may be from the sound wave from the speaker closest to the receiver 120, for example, the sound wave 161 from the speaker 151, reinforced by the sound waves 162, 163, and 164 when they arrive in synch with the sound wave 161 and constructively interfere at the location of the microphone 210. The microphone may continuously generate and output the analog sound signal based on sound arriving at the location of the microphone 210.

The receiver 120 may include a sampler 211. The sampler 211 may be any suitable combination of hardware and software for sampling an analog audio signal to generate a digital audio signal, such as, for example, an ADC or multiple ADCs. The sampler 211 may sample the analog audio signal generated by the microphone 210. The sampler 211 may sample the analog audio signal at any suitable rate, such as, for example, at the same 48 kHz rate as the sampler 201, and may generate a digital audio signal. The sampler 211 may be able to process multiple channels, for example, through a multi-channel ADC or through multiple ADCs. For example, receiver 120 may include more than one microphone, resulting in the generation of more than one analog sound signal. The sampler 211 may continuously generate and output a digital audio signal based on the continuously input analog sound signal from the microphone 210.

The receiver 120 may include an anti-aliasing filter 212. The anti-aliasing filter 212 may be any suitable combination of hardware and software for filtering a digital audio signal. The anti-aliasing filter 212 may be, for example, a hardware filter, or a software-implemented filter. The sampler 211 may output the digital audio signal converted from the analog audio signal generated by the microphone 210 to the anti-aliasing filter 212. The anti-aliasing filter 212 may filter the digital audio signal with any suitable parameters to filter portions of the digital audio signal continuously as they are generated by the sampler 211. For example, the anti-aliasing filter 212 may use a stop band frequency of 1500 Hz, a ripple of 1 dB, a stop band of −50 dB, and a pass band of 1150 Hz. The anti-aliasing filter 212 may continuously filter the digital audio signal and continuously output a filtered digital audio signal.

The receiver 120 may include a down sampler 213. The down sampler 213 may be any suitable combination of hardware and software for down sampling a digital audio signal. The down sampler 213 may be, for example, a hardware or software-implemented down sampler. The anti-aliasing filter 212 may output the filtered digital audio signal to the down sampler 213. The down sampler 213 may down sample the filtered digital audio signal any suitable number of times, such as, for example, the same number of time as the down sampler 203. For example, the filtered digital audio signal may be down sampled by a factor of 16, resulting in a 3 kHz down sampled digital audio signal. The down sampler 213 may continuously down sample continuous input from the anti-aliasing filter 212 and continuously output the down sampled digital audio signal.

The receiver 120 may include an input array. The input array 214 may be implemented in storage of the receiver 120 using a data structure of any suitable size. The input array 214 may be larger than the input array 204. For example, the input array 214 may be a 3000 element array, and each element may store one of 3000 samples. The samples stored in the input array 214 may represent any suitable length of the down sampled digital audio signal. For example, the samples stored in the input array may represent 1000 ms of the down sampled digital audio signal. The input array 214 may be stored on the receiver 120 in any suitable manner, in any suitable storage hardware, including volatile and non-volatile storage. The down sampled digital audio signal continuously output from the down sampler 213 may be continuously stored in the input array 214, for example, on a first-in first-out basis, with new samples pushing down older samples and the newest sample causing the oldest sample to exit the input array 214. The input array 214 may be implemented as a first-in first-out queue. When the input array 214 stores 3000 values, each representing a sample, the input array 214 may represent 1000 ms of the analog audio signal generated by the microphone 210 at a sampling rate of 3 kHz, down sampled by the down sampler 213 from 48000 samples representing the same 1000 ms of the same audio signal at 48 kHz. Samples stored in the input array 214 for the down sampled digital audio signal may be output, or accessed, at specified intervals.

The receiver 120 may include Tukey window 215. The Tukey window 215 may be any suitable combination of hardware and software for windowing a digital audio signal. The Tukey window 215 may be, for example, implemented as a hardware device, or may be implemented in software on the receiver 120. The Tukey window 215 may be used to window the down sampled digital audio signal from the input array 214. The Tukey window 215 may use a number of points matching the size of the input array 204, which may be smaller than the input array 214. For example, the input array 204 may store 2048 samples for the down sampled digital audio signal, and the Tukey window 215 may use 2048 points to window 2048 samples from the input array 214, which may store 3000 samples. A current delay may be used to determine the samples from the input array 214 windowed by the Tukey window. For example, with a current delay of 160 ms, samples from the input array 214 representing a section of the down sampled digital audio signal from 160 ms to 842.7 ms may be used. The last sample in the input array 214, for example, the $3000^{th}$, may represent the down sampled digital audio signal at 0 ms. The $1^{st}$ sample in the input array 214 may represent the audio signal at 1000 ms. The Tukey window 215 may use a ratio of 0.2. The Tukey window 215 may window the down sampled digital audio signal at specified intervals. For example, the windowing of the down sampled digital audio signal from the input array 214 may coincide with the receiving at the receiver 120 of a section of specified length of the multi-channel digital audio signal from the transmitter 110. For example, once the receiver 120 beings receiving the multi-channel digital audio signal, the first windowing of the down sampled digital audio in the input array 214 may occur after a 682.7 ms section of the multi-channel digital audio, and accompanying audio metadata, is received, which may be after 682.7 ms, as the multi-channel digital audio signal may be streamed from the transmitter 110 in real time. Subsequent windowing may occur every 500 ms, after the receiving of 500 ms of the multi-channel digital audio signal and audio metadata generated based on the 500 ms of the source audio signals that were used to generate the 500 ms of the multi-channel digital audio signal along with the immediately previous 182.7 ms of the source audio signals. Subsequent windowing, after the initial windowing, may reuse samples if necessary based on the interval between each windowing and the length of the section of the down sampled digital audio signal that is windowed, for example, using 182.7 ms from the input array 214 that were previously windowed by the Tukey window 215. The Tukey window 215 may output a windowed digital audio signal. The Tukey window 215 may be a component of the computing device of the transmitter 110.

The receiver 120 may include a fast Fourier transform 216. The fast Fourier transform 216 may be any suitable combination of hardware and software for performing an FFT on a digital audio signal to generate a DFT for the digital audio signal. The fast Fourier transform 216 may be, for example, implemented as a hardware device, for example, built-in to a processor, or may be implemented in software, such as signal processing software, on the receiver 120. The fast Fourier transform 216 may transform the windowed digital audio signal output by the Tukey window 215 to the frequency domain using a Fourier transform. For example, the fast Fourier transform 215 may implement a 2048 point FFT on the reversed digital audio signal, generating a DFT representation of the windowed digital audio signal. The DFT representation of the windowed digital audio signal may include any suitable number of complex numbers. For example, the DFT representation generated by a 2048 point FFT may include 2048 complex numbers. The DFT representation may be a frequency domain representation of the windowed digital audio signal. The fast Fourier transform 216 may output the DFT representation of the windowed audio signal. The DFT representation may be normalized in the same manner as the DFT representation on the transmitter 110. The fast Fourier transform 216 may generate the DFT representation at the same intervals that the Tukey window 215 windows the down sampled digital audio signal in the input array 214, as the fast Fourier transform 216 may operate at each instance it receives output from the Tukey window 215.

The receiver 120 may include a multiplier 217. The multiplier 217 may be any suitable combination of hardware and software for performing an element-wise multiplication on DFT representations. The multiplier 217 may be, for example, implemented as a hardware device, for example, built-in to a processor, or may be implemented in software on the receiver 120. The multiplier 217 may receive as input the DFT representation of the windowed digital audio signal from the fast Fourier transform 216 and the DFT representation of the reversed digital audio signal from the audio metadata received from the transmitter 110. The multiplier 217 may implement an element-wise multiplication of the DFT representation of the windowed digital audio signal and the DFT representation of the reversed digital audio signal, resulting in a correlation result in the DFT representation. The multiplication of the DFT representations may correspond to a convolution of the time domain representations used to generate the DFT representations, for example, the values of the input array 214 of the receiver 120 and the reversed values of the input array 204 of the computing device of the transmitter 110 for the windowed digital audio signal and the reversed digital audio signal.

The receiver 120 may include PHAT weighting 218. The PHAT weighting 218 may be any suitable combination of hardware and software for performing an element-wise multiplication on DFT representations. The PHAT weighting 218 may be, for example, implemented as a hardware device, for example, built-in to a processor, or may be implemented in software on the receiver 120. The PHAT weighting 218 may phase transform the correlation result in the DFT representation output by the multiplier 217. The PHAT weighting 218 may implement the phase transform weighting by dividing each complex number of the correlation result in the DFT representation by its own absolute value, generating a PHAT weighted DFT representation. The frequencies represented in the resulting PHAT weighted DFT representation may have their amplitudes set to 1, while phase data for each of the frequencies may be maintained.

The receiver 120 may include an inverse fast Fourier transform 219. The inverse fast Fourier transform 219 may be any suitable combination of hardware and software for performing an inverse FFT on a DFT representation of an audio signal, generating a digital audio signal. The inverse fast Fourier transform 219 may be, for example, implemented as a hardware device, for example, built-in to a processor, or may be implemented in software, such as signal processing software, on the receiver 120. The inverse fast Fourier transform 219 may receive as input the PHAT weighted DFT representation output by the PHAT weighting 218, and may transform the PHAT weighted DFT representation to the time domain. The inverse fast Fourier transform 219 may generate any suitable number of samples for the time domain representation of the PHAT weighted DFT representation. For example, the inverse fast Fourier transform 219 may generate a number of samples corresponding to the number of samples in the input array 204 and 214 of the computing device of the transmitter 110 and the receiver 120, such as 2048 samples. The time domain representation of the PHAT weighted DFT representation may represent a signal that would be the result of convolving the windowed digital audio signal and the reversed digital audio signal with amplitude information removed.

The receiver 120 may include delay search 220. The delay search 220 may be any suitable combination of hardware and software for searching a digital audio signal generated from an inverse fast Fourier transform of multiplied DFT representations for an amplitude spike to determine a delay between the audio signals used to generate the multiplied DFT representations relative to a current delay. The delay search 220 may be, for example, implemented as a hardware device, for example, built-in to a processor, or may be implemented in software, such as signal processing software, on the receiver 120. The delay search 220 may search the time domain representation of the PHAT weighted DFT representation for the sample with the greatest amplitude. For example, the delay search 220 may perform any suitable search on the values of the samples of the time domain representation of the PHAT weighted DFT representation to determine which sample has the highest value, indicating the greatest amplitude. The position of the sample with the greatest amplitude may indicate the amount by which the analog audio signal generated by the microphone 210 of the receiver 120, and the loudest sound wave, for the sound wave 161, from the speakers, for example, the speaker 161, is delayed compared to the multi-channel digital audio signal received from the transmitter 110, relative to the current delay. For example, if the sample with the greatest amplitude is the first or last sample of the time domain representation of the PHAT weighted DFT representation, this may indicate that there is no delay relative to the current delay value. The value of the relative delay may be based on whether the sample with the greatest amplitude is in the first half of samples of the time domain representation of the PHAT weighted DFT, indicating a positive relative delay value, or the second half, indicating a negative relative delay value. The magnitude of the relative delay value, whether positive or negative, may increase as the sample with greatest amplitude approaches the middle sample. If the time domain representation includes more than one sample with the greatest amplitude, any sample with the greatest amplitude may be chosen to determine the delay. The determined relative delay may represent, for example, the amount in addition to the amount indicated by the current delay of the section of the source audio signals used to generate the audio metadata which was not received as sound generated by any of the speakers 151, 152, 153, and 154 at the location of the receiver 120 by the time the entire section has been received at the receiver 120 from the transmitter, for example, as a multi-channel digital audio signal. For example, a current delay of 10 ms and a relative delay of 10 ms may indicate that at the time the first 682.7 ms of the multi-channel digital audio signal, based on the first 682.7 ms section of the source audio signals, was received at the receiver 120, only 662.7 ms of sound generated by the speakers 151, 152, 153, and 154 based on that first section of the source audio signals has been received at the location of the receiver 120 and used by the microphone 210 to generate an audio signal. The delay search may output the value of the relative delay, or may output an indication of the sample with the greatest amplitude, which may be used by another component of the receiver 120 to determine the relative delay.

The receiver 120 may include a controller 221. The controller 221 may be any suitable combination of hardware and software for determining a current delay that may be used to control playback of a digital audio signal by the receiver 120. The controller 221 may be, for example, implemented as a hardware device, for example, a processor or part of a processor, or may be implemented in software on the receiver 120. The controller 221 may implement a histogram. The value of the relative delay output by the delay search 220 may be added to a histogram. The histogram may include any suitable number of bins, and each bin may represent a range of delay values, for example, in milliseconds. For example, the histogram may use an interval of 4 ms, and may have enough bins to represent the entire length of the section of the source audio signals represented by the audio metadata received by the receiver 120. For example, the histogram may include 395 bins, representing delays from −80 ms to 1500 ms, with each bin representing 4 ms The value of the relative delay may be weighted in any suitable manner before being added to the histogram. For example, the value of the relative delay may be weighted according to the value of the root mean square from the audio metadata. The value of the relative delay may be weighted to 0, and therefore discarded, if the value of the root means square from the audio metadata is less than 300, weighted to 1 if the value of the root mean square is 300 to 2000, and weighted to 2 if the value of the root mean square is above 2000. Discarded relative delay values may have been determined based on sections of the source audio signals which contain little or no sound, resulting in a very low root mean square value, and indicating a lack of activity from the audio sources.

Any suitable number of relative delay values may be used in the histogram. For example, the histogram may use 26 relative delay values, which may be replaced on a first-in first-out basis. The relative delay values used in the histogram may be stored on the receiver 120 in any suitable manner, in any suitable volatile or non-volatile storage which may be accessible to the controller 221. The values of the relative delays used in the histogram may be weighted for recency. For example, the histogram may use 26 relative delay values, with the 13 most recent relative delay values weighted by a factor of 2 in addition to any weighting of those relative delay values based on the values of their corresponding root mean squares, and the 13 oldest relative delay values may be weighted by a factor of 1 in addition to any weighting of those relative delay values based on the values of their corresponding root mean squares. For example, the most recent value for a relative delay to enter the histogram may have a corresponding root mean square of 2500, resulting in the value for the relative delay being weighted by a factor of 4. The histogram may also use any other suitable weightings for relative delay values. When a relative delay value is added to the histogram, the count for the bin of the histogram corresponding to the relative delay value may be increased according to the weighting of the relative delay. For example, the most recent value for a relative delay to enter the histogram may be 2.5 ms, and may have a weighting of 4, resulting in the count for the 0 ms to 4 ms bin of the histogram increasing by 4. As new relative delay values enter the histogram, counts from the oldest relative delay value, which falls out of the histogram, may be removed from the appropriate bin, and changes in recency weightings may result in changes to the counts of any bins of the histogram.

The controller 220 may use the histogram to determine an adjustment to the current delay. For example, the controller 220 may determine an adjustment to the current delay based on the counts for the various bins of the histogram and the delay values to which the bins correspond. The adjustment to the current delay may be determined in any suitable manner. For example, the histogram bin with the highest count may be used as the adjustment to the current delay, based on, for example, the average delay represented by that histogram bin. For example, a histogram may have a count of 16 in the 0 ms to 4 ms bin, a count of 28 in the 4 ms to 8 ms bin, a count of 10 in the 8 ms to 12 ms bin, and a count 6 in the 12 ms to 16 ms bin. The adjustment to the current delay may be may be 6 ms, based on the 4 ms to 8 ms bin having the highest count of any bin in the histogram. The controller 220 may output the adjustment to the current delay, which may be used to adjust the current delay.

The current delay, as adjusted based on the adjustment determined by the histogram, may be used to adjust the data from the input array 214 used when determining the next relative delay value. For example, the input array 214 may store 3000 samples, of which 2048 samples are used to determine a relative delay value. The samples may represent 1000 ms of audio signal. When determining the next relative delay value, the samples windowed using the Tukey window 215 may be samples starting at the current delay value and going up to 682.7 ms from the current delay value. For example, if the current delay value is 0 ms, which it may be initially, the samples from the input array that are windowed may be from 0 ms, which may be the oldest sample in the input array, to 682.7 ms. If the current delay value is 160 ms, the samples that are windowed may be from 160 ms to 842.7 ms. This may allow the relative delay value to be determined relative to the current delay value as adjusted based on the histogram.

The receiver 120 may include an audio processor 222. The audio processor 222 may be any suitable combination of hardware and software for processing a multi-channel digital audio signal. The audio processor 222 may be, for example, implemented as a hardware device, for example, a special purpose hardware device, or may be implemented in software on the receiver 120. The audio processor 222 may receive the multi-channel digital audio signal from the transmitter 110, and may process the multi-channel digital audio signal in any suitable manner. For example, the audio processor 222 may mix and equalize the multi-channel digital audio signal based on preset mixing instructions or equalization settings, or based on input from a user of the receiver 120. The audio processor 222 may combine channels in the multi-channel digital audio signal, for example, to produce a stereo digital audio signal that may be suitable for playback over a two-channel sound generating device, such as a pair headphones. The audio processor 222 may output the digital audio signal, for example, the stereo digital audio signal, generated by processing the multi-channel digital audio signal.

The receiver 120 may include a resampler 223. The resampler 223 may be any suitable combination of hardware and software for determining resampling a digital audio signal. The resampler 223 may be, for example, implemented as a hardware device, for example, a special purpose hardware device such as an audio asynchronous resampler, or may be implemented in software on the receiver 120. The resampler 223 may receive the current delay from the controller 221, for example, as adjusted based on the histogram, and may receive the digital audio signal, for example the stereo digital audio signal, output by the audio processor 222. The resampler 223 may use the current delay to adjust the generation of sound by the receiver 120 based on the multi-channel digital audio signal received from the transmitter 110. For example, the current delay may indicate the amount of time by which the multi-channel digital audio signal from the transmitter 110 is ahead of the analog audio signal being generated by the microphone 210 based on the sound wave 161 from the speaker 151. To synchronize the sound a person using the receiver 120 hears from the speaker 151 with the sound the person would hear using headphones connected to the receiver 120, the digital audio signal output by the audio processor 222 which is used to generate sound through the headphones may be delayed, or sped up, according to the current delay For example, resampler 223 may resample a digital audio signal received from the audio processor 222 and generated based on the multi-channel digital audio signal received from the transmitter 110 before the digital audio signal is used to generate sound. The resampling may slow down the playback of the digital audio signal, for example, duplicating samples, in order to increase the amount of time over which a section of the digital audio signal is used to generate sound. This may cause an increase in playback time for a section of the digital audio signal, for example, causing a section that originally represented 100 ms of audio to take 102 ms to play back, implementing a delay of 2 ms. The resampler 223 may implement resampling to delay the playback of the digital audio signal in any suitable manner, and over any suitable period of time. The resampler 223 may avoid implementing too great of a delay over too short of a period of time, as the resampling may cause audio artifacts or noticeable changes in pitch in the generated sound. The resampler 223 may also speed up the playback of the digital audio signal, for example, dropping samples, and may also avoid implementing too great of a speed up over too short of a time period.

The current delay may be the total delay needed at the time the current delay is determined, and previous delays implemented by the resampler 223 may count toward this total. For example, the first current delay, as adjusted by the controller 221, may be 10 ms. The resampler 223 may have delayed playback of the digital audio signal output by the audio processor 222 by 5 ms when the controller 221 adjust the current delay to 9 ms. Because playback of the digital audio signal is already delayed by 5 ms, the resampler 232 may only delay playback of the digital audio signal by an additional 4 ms, bringing the total delay to 9 ms, matching the current delay. If the current delay, as adjusted by the controller 221, is not 9 ms, for example, is 7 ms or 10 ms, the resampler 223 may delay or speed up playback of the digital audio signal accordingly, for example, implementing a 2 ms speed up to bring the total delay to 7 ms, or implementing an additional 1 ms delay to bring the delay to 10 ms. The current delay may change, for example, due to a person moving and changing the distance between the microphone 210 of the receiver 120 and the nearest speaker, for example, the speaker 151, or due to changes in the transmission environment for the transmitter 110. When the total delay matches the most recent current delay, the resampler 223 may allow the digital audio signal to play back without delaying or speeding up the playback of the digital audio signal.

The resampler 223 may output a resampled digital audio signal to any suitable components of the receiver 120 for play back of the digital audio signal through a sound generating device, such as speakers or headphones. For example, the resampler 223 may output the resampled digital audio signal to a DAC, which may convert the digital audio signal to an analog audio signal. The analog audio signal may then be amplified, for example, by an operational amplifier of the receiver 120, before being output to a sound generated device. When the total delay implemented by the resampler 223 matches the current delay indicated by the controller 221, the sound generated by the sound generating device may be synchronized with sound from, for example, the sound wave 161 generated by the speaker 151. A person using the sound generating device of the receiver 120 may hear sounds generated by the audio sources 101 through the speaker 161 and through the sound generating device of the receiver 120 at approximately the same time.

Figure 3A:
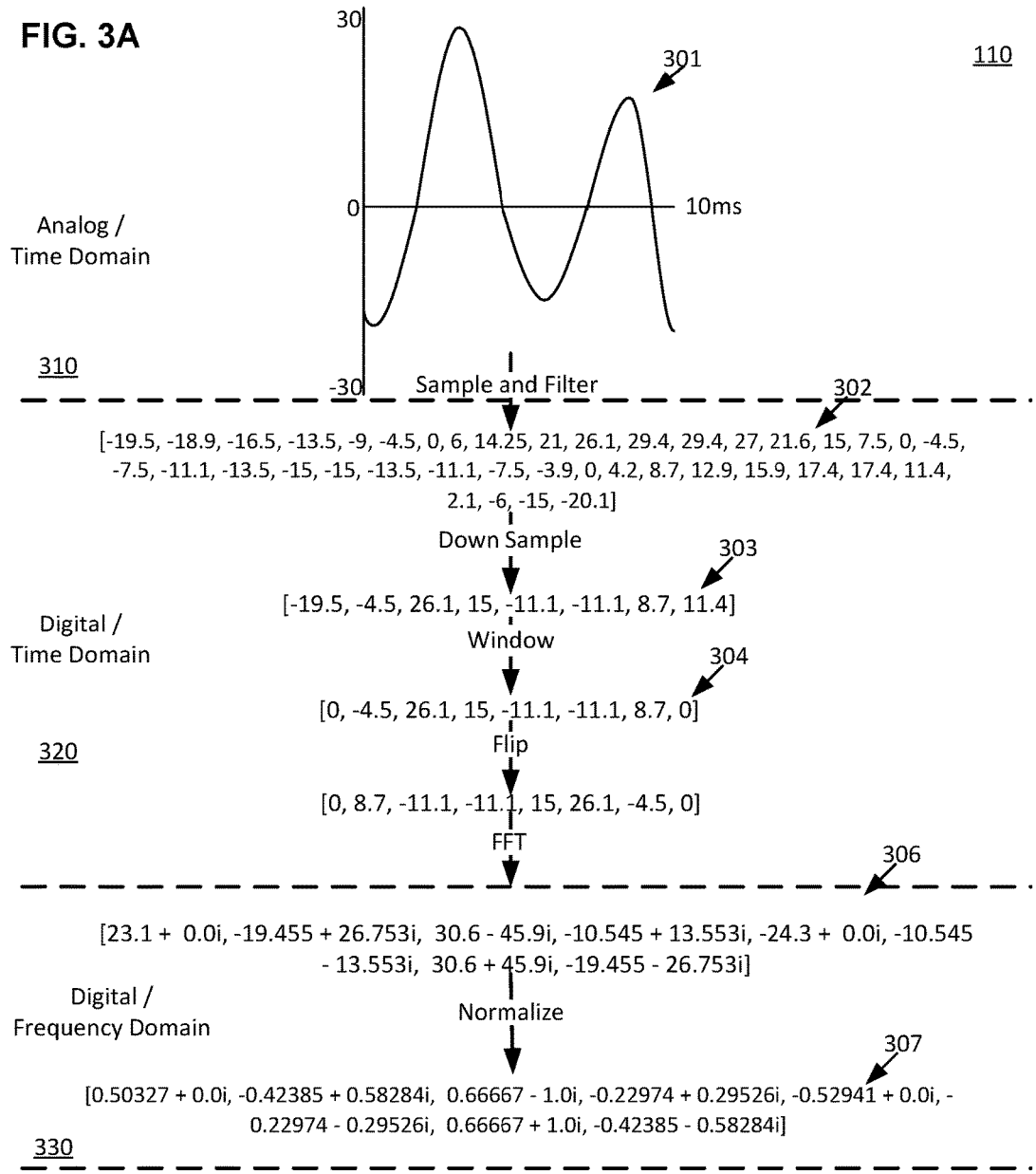
FIG. 3A shows an example arrangement suitable for audio synchronization and delay estimation according to an implementation of the disclosed subject matter.

FIG. 3A shows an example arrangement suitable for audio synchronization and delay estimation according to an implementation of the disclosed subject matter. At the transmitter 110, an audio signal 301 may be sampled and filtered, for example, with the sampler 201 and the anti-aliasing filter 202. The audio signal 301 may be, for example, an analog representation of sound over any suitable time period in time domain 310. For example, the audio signal 301 may represent sound from the audio sources 101 over 10 ms. The audio signal 301 may be continuously sampled at any suitable sample rate and may then be filtered to prevent anti-aliasing, generating a filtered digital audio signal 302. The filtered digital audio signal 302 may be a digital representation of the audio signal 301, and the sound represented by the audio signal 301, in time domain 320. The filtered digital audio signal 302 may include any suitable number of samples at any suitable sampling rate. For example, the filtered digital audio signal 302 may include 40 samples to represent the 10 ms of the audio signal 301, at a sampling rate of 4 kHz.

The filtered digital audio signal 302 may be continuously down sampled, for example, by the down sampler 203. The filtered digital audio signal 302 may be down-sampled by any suitable factor, in any suitable manner. For example, the filtered digital audio signal 302 may be down sampled by a factor of 5, generating a down sampled digital audio signal 303. The down sampled digital audio signal 303 may be a digital representation of the audio signal 301, and the sound represented by the audio signal 301, in the time domain 320. The down sampled digital audio signal 303 may include any suitable number of samples at any suitable sampling rate. For example, the down sampled digital audio signal 303 may include 8 samples to represent the 10 ms of the audio signal 301, at a sampling rate of 800 Hz.

The down sampled digital audio signal 303 may be windowed at any suitable interval using any suitable window, with any suitable parameters. For example, the down sampled digital audio signal 303 may be windowed using the Tukey window 206, generating a windowed digital audio signal 304. The windowed digital audio signal 304 may be a digital representation of the audio signal 301, and the sound represented by the audio signal 301, in the time domain 320.

The windowed digital audio signal 304 may be flipped, for example, by the data flipper 207, reversing the order of the samples of the windowed digital audio signal 304. For example, the windowed digital audio signal 304 may be flipped in the memory of the transmitter 110 through memory mapping operations, generating a reversed digital audio signal 305. The reversed digital audio signal 305 may be a digital representation of the reverse of the audio signal 301, and the sound represented by the reverse of the audio signal 301, in the time domain 320.

The reversed digital audio signal 305 may be transformed into the frequency domain, for example, using the fast Fourier transform 208. For example, the reversed digital audio signal 305 may be processed using any suitable Fourier transform function, using any suitable parameters, generating a DFT representation 306 of the reversed digital audio signal 305. The DFT representation 306 may be a digital representation of the reverse of the audio signal 301, and the sound represented by the reverse of the audio signal 301, in the frequency domain 330.

The DFT representation 306 may be normalized to any suitable normal, for example, using the fast Fourier transform 208. For example, the DFT representation 306 may be normalized so that the maximum value of any real or imaginary component among all of the complex numbers in the DFT representation 306 is 1 by dividing the value of each real and imaginary number of the DFT representation 306 by the absolute value of the real or imaginary number with the largest magnitude in the DFT representation 306, generating a normalized DFT representation 307. The normalized DFT representation 307 may be a digital representation of the reverse of the audio signal 301, and the sound represented by the reverse of the audio signal 301, in the frequency domain 330.

Figure 3B:
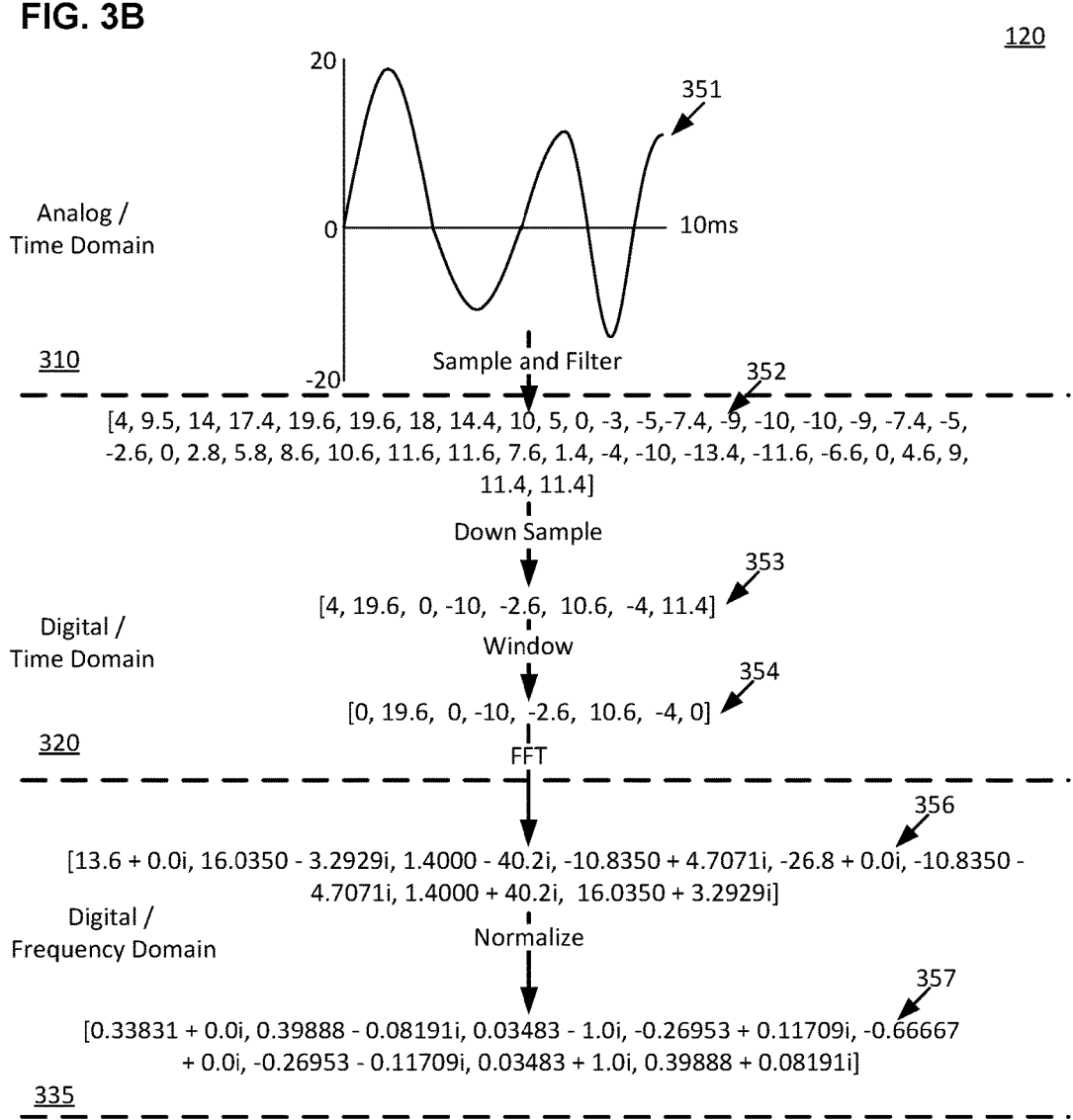
FIG. 3B shows an example arrangement suitable for audio synchronization and delay estimation according to an implementation of the disclosed subject matter.

FIG. 3B shows an example arrangement suitable for audio synchronization and delay estimation according to an implementation of the disclosed subject matter. At the receiver 120, an audio signal 351 may be sampled and filtered, for example, with the sampler 211 and the anti-aliasing filter 212. The audio signal 351 may be, for example, an analog representation of sound over any suitable time period in time domain 310. For example, the audio signal 351 may represent sound from the audio sources 101 over 10 ms, as recorded by the microphone 210 of the receiver 120 based on sound waves 161, 162, 163, and 164 as received from the speakers 151, 152, 153, and 154. The audio signal 351 and the audio signal 301 may both be based on sound generated by the audio sources 101 over the same time period. The audio signal 351 may be continuously sampled at any suitable sample rate and may then be filtered to prevent anti-aliasing, generating a filtered digital audio signal 352. The filtered digital audio signal 352 may be a digital representation of the audio signal 351, and the sound represented by the audio signal 351, in time domain 320. The filtered digital audio signal 352 may include any suitable number of samples at any suitable sampling rate. For example, the filtered digital audio signal 302 may include 40 samples to represent the 10 ms of the audio signal 351, at a sampling rate of 4 kHz.

The filtered digital audio signal 352 may be continuously down sampled, for example, by the down sampler 213. The filtered digital audio signal 352 may be down-sampled by any suitable factor, in any suitable manner. For example, the filtered digital audio signal 352 may be down sampled by a factor of 5, generating a down sampled digital audio signal 353. The down sampled digital audio signal 353 may be a digital representation of the audio signal 351, and the sound represented by the audio signal 351, in the time domain 320. The down sampled digital audio signal 353 may include any suitable number of samples at any suitable sampling rate. For example, the down sampled digital audio signal 353 may include 8 samples to represent the 10 ms of the audio signal 351, at a sampling rate of 800 Hz.

The down sampled digital audio signal 353 may be windowed at any suitable interval using any suitable window, with any suitable parameters. For example, the down sampled digital audio signal 353 may be windowed using the Tukey window 215, generating a windowed digital audio signal 354. The windowed digital audio signal 354 may be a digital representation of the audio signal 351, and the sound represented by the audio signal 351, in the time domain 320.

The windowed digital audio signal 354 may be transformed into the frequency domain, for example, using the fast Fourier transform 216. For example, the windowed digital audio signal 354 may be processed using any suitable Fourier transform function, using any suitable parameters, generating a DFT representation 356 of the windowed digital audio signal 354. The DFT representation 356 may be a digital representation of the of the audio signal 351, and the sound represented by the audio signal 351, in the frequency domain 330.

The DFT representation 356 may be normalized to any suitable normal, for example, using the fast Fourier transform 216. For example, the DFT representation 356 may be normalized so that the maximum value of any real or imaginary component among all of the complex numbers in the DFT representation 356 is 1 by dividing the value of each real and imaginary number of the DFT representation 356 by the absolute value of the real or imaginary number with the largest magnitude in the DFT representation 356, generating a normalized DFT representation 357. The normalized DFT representation 357 may be a digital representation of the audio signal 351, and the sound represented by the audio signal 351, in the frequency domain 330.

FIG. 3C shows an example arrangement suitable for audio synchronization and delay estimation according to an implementation of the disclosed subject matter. The DFT representation 307 may be transmitted to the receiver 120, for example, as part of the audio metadata transmitted by the transmitter 110 to the receiver 120. The DFT representation 307 may be multiplied with the DFT representation 357, for example, by the multiplier 217. For example, the DFT representation 307 and the DFT representation 357 may be multiplied element-wise, generating a correlation result in the DFT representation 361. The correlation result in the DFT representation 361 may be a digital representation of the cross-synthesis of the sound represented by the reverse of the audio signal 301 with the sound represented by the audio signal 351 in the frequency domain 330.

The correlation result in the DFT representation 361 may be phase transformed, for example, by the PHAT weighting 218. For example, the correlation result in the DFT representation 361 may be phase transformed by dividing each complex number of the correlation result in the DFT representation 361 by its own absolute value, generating a PHAT weighted DFT representation 362. The PHAT weighted DFT representation 362 may be a digital representation of the cross-synthesis of the sound represented by the reverse of the audio signal 301 with the sound represented by the audio signal 351, with amplitude information removed, in the frequency domain 330.

The PHAT weighted DFT representation 362 may be transformed into the time domain, for example, by the inverse fast Fourier transform 219. For example, the PHAT weighted DFT representation 362 may be processed using any suitable inverse Fourier transform function, using any suitable parameters, generating correlated digital signal 363. The correlated digital signal 363 may be a digital representation of the cross-synthesis of the sound represented by the reverse of the audio signal 301 with the sound represented by the audio signal 351, with amplitude information removed, in the time domain 320. The correlated digital signal 363 may include any suitable number of samples. For example, the correlated digital signal 363 may include 8 samples.

Any suitable samples from the correlated digital signal 363 may be used in any suitable manner to determine a relative delay between the audio signal 301 and the audio signal 351, for example, by the delay search 220. The position of the sample with the greatest amplitude may be subtracted from the number of remaining samples and multiplied by the amount of time represented by each sample to determine the relative delay. The sample with the greatest amplitude of the 8 remaining samples may be the $7^{th}$ sample. The location of the sample with the greatest amplitude in the correlated digital signal 363 may indicate that the audio signal 351 is ahead of the audio signal 301. The relative delay between the audio signal 301 and the audio signal 351 may be used in conjunction with a current delay to determine how much to delay the playback of an audio signal related to the audio signal 301 on the receiver 120 in order to synchronize with the sound that used to generate audio signal 351, for example, by the controller 221. The accuracy of the determined relative delay may be limited by the number of samples in the correlated digital signal. Graph 364 may be a visual representation of the correlated digital signal 363.

Figure 4:
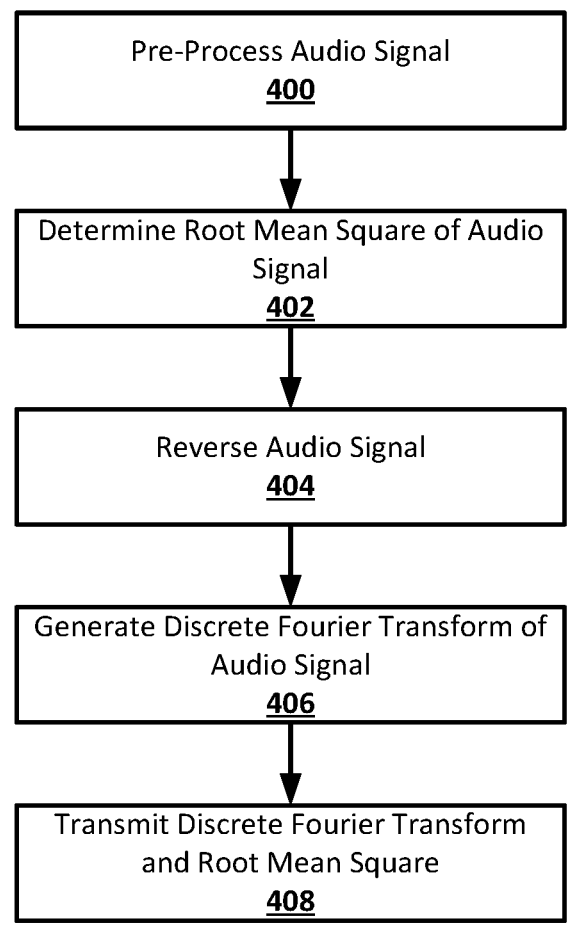
FIG. 4 shows an example procedure suitable for audio synchronization and delay estimation according to an implementation of the disclosed subject matter.

FIG. 4 shows an example procedure suitable for audio synchronization and delay estimation according to an implementation of the disclosed subject matter. At 400, an audio signal may be pre-processed. For example, source audio signals generated by the audio sources 101 may be pre-processed at the computing device of the transmitter 110. The pre-processing may include, for example, sampling of the audio signal, which may be analog, by the sampler 201, filtering of the resulting digital audio signal by the anti-aliasing filter 202, and down sampling of the resulting filtered digital audio signal by the down sampler 203. An audio signal that is continuously input to the computing device of the transmitter 110 may be continuously pre-processed, and the resulting signal from pre-processing may be stored, for example, in the input array 204 which may be a first-in first-out data structure. Any suitable number of samples, representing any suitable length of the audio signal input to the computing device of the transmitter 110, may be stored.

At 402, a root mean square of the audio signal may be determined. For example, the RMS determiner 205 may determine the root mean square of a section of the audio signal, for example, as stored in the input array 204. The RMS determiner 205 may determine the root mean square at specified intervals, for example, every 500 ms. For example, the input array 204 may store samples representing a 682.7 ms section of the audio signal, and the RMS determiner 205 may determine a first root mean square after 682.7 ms, and then may determine additional root mean squares every 500 ms thereafter, using samples representing the previous 682.7 ms of the audio signal. The root mean square may be stored, for example, in the transmission buffer 209 as part of the audio metadata for the section of the audio signal for which it was determined.

At 404, the audio signal may be reversed. For example, the data flipper 207 may reverse the ordering of the samples in the digital audio signal generated by pre-processing the audio signal. The data flipper 207 may, for example, change the memory mapping of the digital audio signal. The audio signal may be reversed at intervals, for example at the same intervals, and at the same time, that the root mean square is determined. The section of the audio signal that is reversed may be the same section of the audio signal for which the root means square was determined. Before being reversed, the audio signal may be windowed using any suitable window, such as, for example, the Tukey Window 206.

At 406, a discrete Fourier transform of the audio signal may be generated. For example, the reversed digital audio signal generated by the data flipper 207 may be transformed to the frequency domain using the fast Fourier transform 208, which may use any suitable parameters to generate a discrete Fourier transform representation. The discrete Fourier transform representation may be stored, for example, in the transmission buffer 209 along with the root mean square as part of the audio metadata for the same section of the audio signal for which the root mean square was determined. The discrete Fourier transform representation may also be normalized, for example, dividing each component of each complex number of the discrete Fourier transform representation by the absolute value of the component with the greatest magnitude among all the complex numbers of the discrete Fourier transform. The discrete Fourier transform may be generated at intervals, for example, the same intervals at which the root mean square is determined, and after the audio signal is reversed. Completion of reversal of the audio signal may trigger the generation of the discrete Fourier transform.

At 408, the discrete Fourier transform representation and root mean square may be transmitted. For example, the discrete Fourier transform representation and root mean square stored in the transmission buffer 209 may be transmitted wirelessly as audio metadata by the transmission device of the transmitter 110, for example, using the wireless signal 171. The transmission may be a wireless broadcast using any suitable wireless protocol, and the audio metadata may be encoded for transmission in any suitable format. The wireless signal 171, carrying the audio metadata, along with the section of the audio signal for which the audio metadata was determined, may be received at various receivers, such as the receivers 120, 121, 122, and 123, which may be, for example personal audio devices used by persons in a venue. The transmission of the discrete Fourier transform representation and the root mean square may occur at intervals, for example, the same intervals at which the root mean square is determined, and after both root mean square and discrete Fourier transform representation are stored in the transmission buffer 209. The audio signal may be streamed continuously from the transmitter 110.

Figure 5:
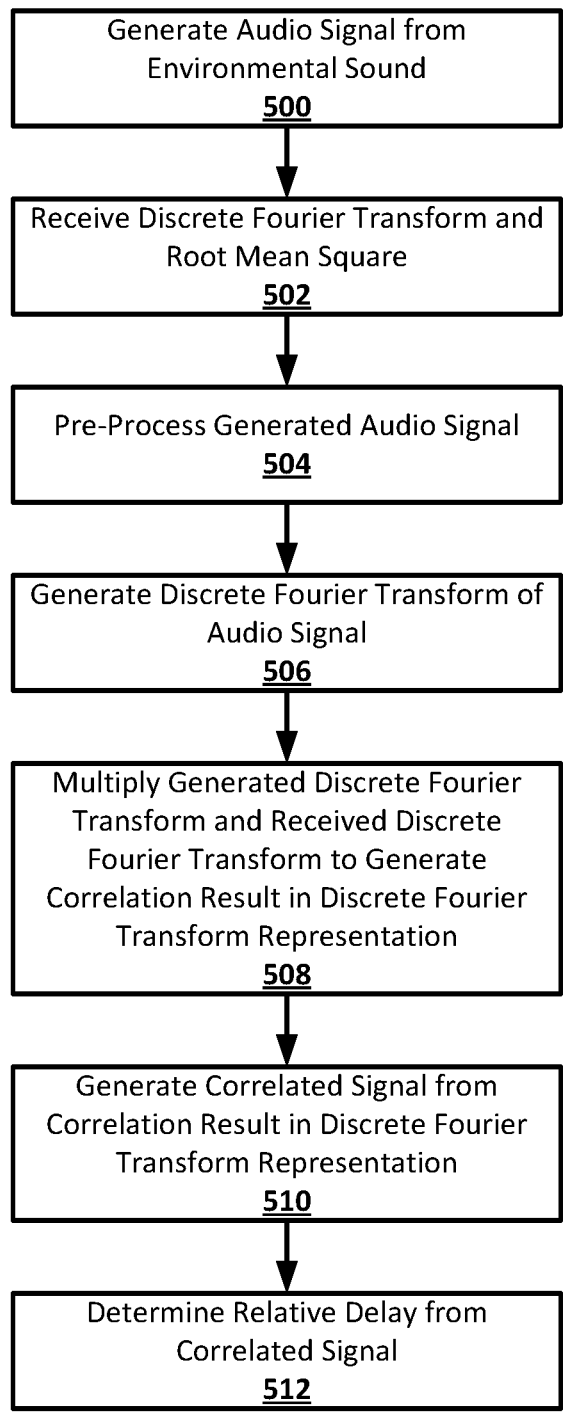
FIG. 5 shows an example procedure suitable for audio synchronization and delay estimation according to an implementation of the disclosed subject matter.

FIG. 5 shows an example procedure suitable for audio synchronization and delay estimation according to an implementation of the disclosed subject matter. At 500, an audio signal may be generated from environmental sound. For example, the microphone 210 of the receiver 120 may generate an audio signal based on sound at the location of the microphone 210. The sound may include, for example, sound waves 151, 152, 153, and 154 from the speakers 151, 152, 153, and 154, which may be based on an audio signal originating with the audio sources 101 and processed through the audio processing 105. The audio signal may be generated continuously as sound arrives at the microphone 210.

At 502, a discrete Fourier transform and root mean square may be received. For example, audio metadata including a discrete Fourier transform representation and root mean square for a section of the audio signal originating with the audio sources 101 may be received at the receiver 120 through wireless signal 171 from the transmission device of the transmitter 110.

At 504, the audio signal may be pre-processed. For example, the audio signal generated based on environmental sound, for example, by the microphone 210, may be pre-processed by the receiver 120. The pre-processing may include, for example, sampling of the audio signal, which may be analog, by the sampler 211, filtering of the resulting digital audio signal by the anti-aliasing filter 212, and down sampling of the resulting filtered digital audio signal by the down sampler 213. An audio signal that is continuously input to the computing device of the transmitter 110 may be continuously pre-processed, and the resulting signal from pre-processing may be stored, for example, in the input array 204 which may be a first-in first-out data structure. Any suitable number of samples, representing any suitable length of the audio signal input to the computing device of the transmitter 110, may be stored. The signal resulting from pre-processing may also be windowed, for example, by the Tukey window 215. Windowing with the Tukey window 215 may occur at specified intervals, such as, for example, after the entirety of a section of audio signals based on a section of the source audio signals is received at the receiver 120 along with its corresponding audio metadata.

At 506, a discrete Fourier transform of the audio signal may be generated. For example, the pre-processed digital audio signal, which may be a windowed digital audio signal, may be transformed to the frequency domain using the fast Fourier transform 216, which may use any suitable parameters to generate a discrete Fourier transform representation. The discrete Fourier transform representation may be normalized, for example, dividing each component of each complex number of the discrete Fourier transform representation by the absolute value of the component with the greatest magnitude among all the complex numbers of the discrete Fourier transform.

At 508, the generated discrete Fourier transform may be multiplied with the received discrete Fourier transform to generate a correlation result in a discrete Fourier transform representation. For example, the multiplier 217 may multiply the discrete Fourier transform representation generated using the fast Fourier transform 216 on the receiver 120 with the discrete Fourier transform representation received as part of the audio metadata from the transmitter 110. The result of the multiplication may be a correlation result in a discrete Fourier transform representation. The correlation result in a discrete Fourier transform representation may also be weighted. For example, PHAT weighting may be applied to the correlation result in a discrete Fourier transform representation, dividing each complex number by its own absolute value, removing amplitude information while preserving phase information.

At 510, a correlated signal may be generated from the correlation result in a discrete Fourier transform representation. For example, a correlated audio signal may be generated from the correlation result in a discrete Fourier transform representation, which may be PHAT weighted, using the inverse fast Fourier transform 219. The correlated signal may be a digital signal and may include any suitable number of samples, for example, depending on the number of samples used to generate the discrete Fourier transform representations on the receiver 120 and the transmitter 110.

At 512, a relative delay may be determined from the correlated signal. For example, the delay search 220 may determine the sample of the correlated signal with the greatest magnitude. The position of the sample with the greatest magnitude may indicate the magnitude and sign of the relative delay. For example, if the sample with greatest magnitude is in the first half of the correlated signal, the relative may be positive, otherwise, if the sample is in the second half of the correlated signal, the relative delay may be negative. If the sample with the greatest magnitude is the first or last sample of the correlated signal, the relative delay may be zero. The accuracy of the determined relative delay value may be limited by, for example, the granularity of the samples. For example, if each sample represents 4 ms of the audio signal, a relative delay of 2 ms may not be determined.

Figure 6:
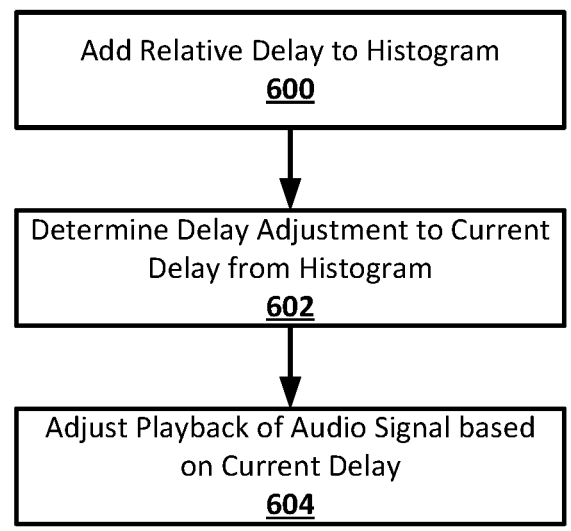
FIG. 6 shows an example procedure suitable for audio synchronization and delay estimation according to an implementation of the disclosed subject matter.

FIG. 6 shows an example procedure suitable for audio synchronization and delay estimation according to an implementation of the disclosed subject matter. At 600, a relative delay may be added to a histogram. For example, the controller 221 may receive a relative delay value output by the delay search 220, and may add the relative delay value to a set of values used in the running histogram. The running histogram may be based on any suitable number of relative delay values, and may include any suitable number of bins with any suitable granularity. For example, the granularity of the histogram bins may match the granularity of the samples of the correlated audio signal. The values in the histogram may be weighted in any suitable manner. For example, a relative delay value may be weighted according to the root mean square that was included in the audio metadata along with the discrete Fourier transform representation that was used to determine the relative delay value. A relative delay value may also be weighted according to recency.

At 602, an adjustment to a current delay may be determined from the histogram. For example, the controller 221 may determine an adjustment to the current delay by determining the bin of the histogram with the highest count. The delay represented by the bin of the histogram with the highest count may be added to the current delay, which may initially be zero before any relative delays have been determined, to adjust the current delay. The current delay may also be initially set based on a known distance between, for example, the receiver 120 and a speaker, such as the speaker 151.

At 604, playback of an audio signal may be adjusted based on the current delay. For example, the receiver 120 may receive an audio signal from the transmitter 110, which may be based on audio signals originating with the audio sources 101. The audio signal may be, for example, a multi-channel digital audio signal. The audio signal may be buffered or otherwise stored on the receiver 120 for playback through a sound generating device, such as headphones, connected to the receiver 120. The audio signal may be delayed or sped up based on the current delay as adjusted by the controller 221, and on a total amount of time by which the audio signal has already been delayed. For example, if the current delay is 6 ms, and the audio signal has not yet been delayed at all, the resampler 223 may attempt to delay the audio signal by 6 ms before the next current delay is received from the controller 221, slowing down playback of the audio signal through, for example, duplicated samples. If after the next adjustment by the controller 221, the current delay is 8 ms, and the resampler 223 successfully delayed playback of the audio signal by 6 ms after receiving the previous current delay of 6 ms, the resampler 223 may delay playback of the audio signal by an additional 2 ms. The resampler 223 may also speedup playback of the audio signal, for example, dropping samples. For example, if after delaying playback of the audio signal by 8 ms, the current delay is adjusted to 5 ms, the resampler 223 may speed up playback of the audio signal by 3 ms. The resampler 223 may avoid delaying or speeding up the audio signal too much over too short a time period to avoid introducing audio artifacts or pitch changes. For example, if the current delay is 15 ms, and playback of the audio signal has not yet been delayed at all, the resampler 223 may only be able to delay playback of the audio signal by 8 ms before the next adjustment of the current delay is made by the controller 221. This may allow the resampler 223 to gradually synchronize playback on the receiver 120 of an audio signal based on audio signals from the audio sources 101 with the arrival of sound generated by speakers, such as the speakers 151, 152, 153, and 154, based on the same audio signals from the audio sources 101, at the location of the receiver 120, even as a person with the receiver 120 moves. This may prevent a person from hearing audio generated by the receiver 120, for example, through headphones, being echoed by the sound generated by the speakers 151, 152, 153, and 154.

Figure 7:
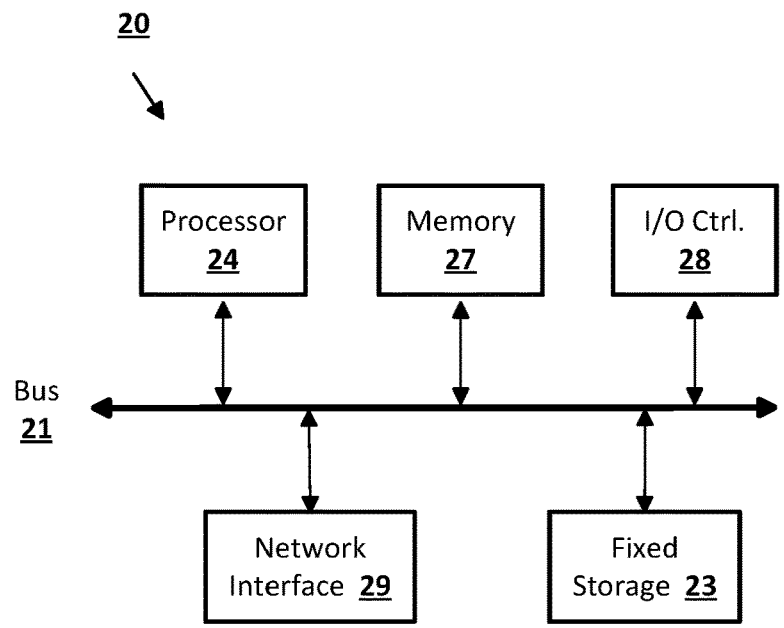
FIG. 7 shows a computer according to an embodiment of the disclosed subject matter.

Embodiments of the presently disclosed subject matter may be implemented in and used with a variety of component and network architectures. FIG. 7 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 8.

Many other devices or components (not shown) may be connected in a similar manner, such as document scanners, digital cameras, auxiliary, supplemental, or backup systems, or the like. Conversely, all of the components shown in FIG. 7 need not be present to practice the present disclosure. The components can be interconnected in different ways from that shown. The operation of a computer such as that shown in FIG. 7 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 8:
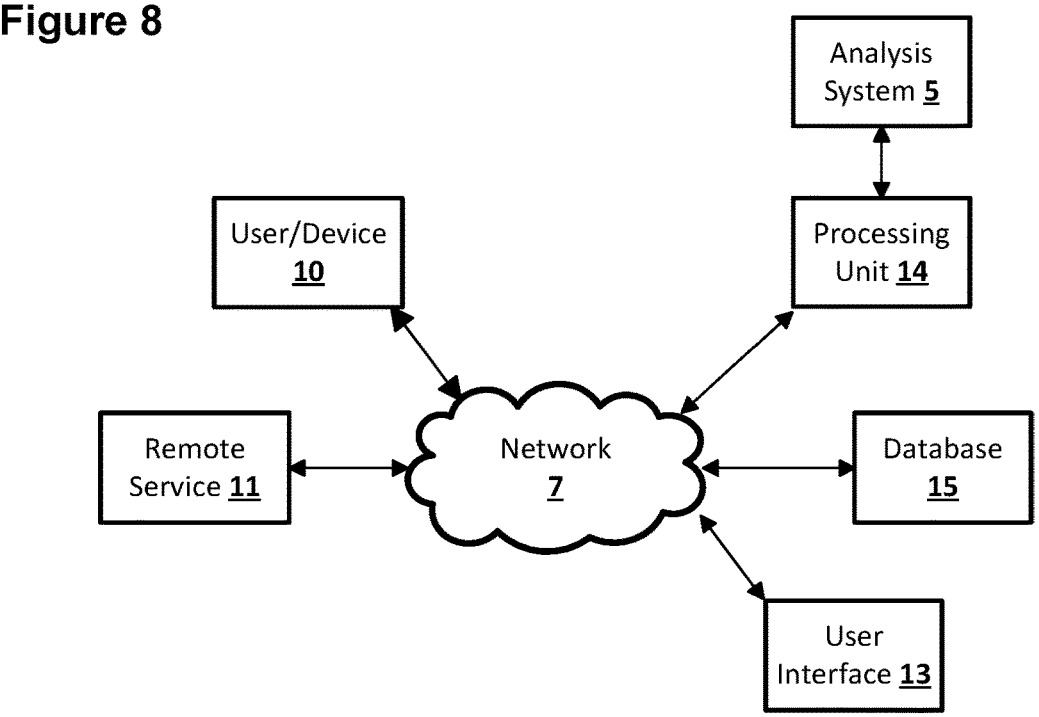
FIG. 8 shows a network configuration according to an embodiment of the disclosed subject matter.

FIG. 8 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   pre-processing an audio signal at a transmitter to generate a transmitter pre-processed audio signal comprising samples, each sample comprising a value and having a position in the transmitter pre-processed audio signal;
   reversing, by the transmitter, the positions of the samples of the transmitter pre-processed audio signal to generate a reversed audio signal;
   generating, by the transmitter, a transmitter discrete Fourier transform representation from the reversed audio signal;
   transmitting, by the transmitter, at least a section of the transmitter discrete Fourier transform representation to a receiver as audio metadata;

receiving, by the receiver, the audio metadata comprising the at least a section of the transmitter discrete Fourier transform representation;
pre-processing, by the receiver, a second audio signal;
generating, by the receiver, a receiver discrete Fourier transform representation from the pre-processed second audio signal;
generating, by the receiver, a correlation result in a discrete Fourier transform representation based on an element-wise multiplication of the at least a section of the transmitter discrete Fourier transform representation and the receiver discrete Fourier transform representation;
performing, by the receiver, an inverse Fourier transform on the correlation result in a discrete Fourier transform representation to generate a correlated signal comprising one or more samples, each sample of the correlated signal having a position in the correlated signal and comprising a value;
determining, by the receiver, a relative delay value based on the position in the correlated signal of a sample comprising a value with the greatest magnitude of the values of the samples of the correlated signal; and
adjusting, by the receiver, playback of a third audio signal based on a current delay value adjusted based on the relative delay value by adding the relative delay value to a histogram,
determining an adjustment to the current delay value based on the histogram,
adjusting the current delay value based on the determined adjustment, and
adjusting the playback of the third audio signal so that value of a total delay in playback of the third audio signal moves towards the current delay value if the total delay is not equal to the current delay value.

2. The method of claim 1, wherein pre-processing the audio signal at the transmitter comprises one or more of sampling the audio signal, and filtering the audio signal, down sampling the audio signal.

3. The method of claim 1, wherein the audio signal is an analog audio signal and wherein the pre-processed audio signal is a digital audio signal.

4. The method of claim 1, further comprising generating the second audio signal at the receiver based on sounds arriving at the location of a microphone of the receiver.

5. The method of claim 4, wherein the sounds arriving at the location of the microphone of the receiver are generated by one or more speakers based on source audio signals that are used to generate the audio signal that is pre-processed by the transmitter.

6. The method of claim 1, wherein the third audio signal is transmitted from the transmitter to the receiver, and wherein the third audio signal is generated based on source audio signals that are used to generate the audio signal that is pre-processed by the transmitter.

7. The method of claim 1, wherein the audio metadata further comprises a root mean square value determined by the transmitter based on the audio signal, and further comprising:
weighting the relative delay value in the histogram based on one or both of the root mean square value and a recency of the relative delay value compared to one or more relative delay values of the histogram.

8. The method of claim 1, further comprising phase transform weighting the correlation result in a discrete Fourier transform representation before performing the inverse Fourier transform.

9. The method of claim 1, further comprising one or more of normalizing, by the transmitter, the transmitter discrete Fourier transform representation and normalizing, by the receiver, the receiver discrete Fourier transform representation.

10. The method of claim 1, further comprising windowing, by the transmitter, the pre-processed audio signal before reversing the positions of the samples of the pre-processed audio signal.

11. The method of claim 1, wherein pre-processing the audio signal is performed continuously by the transmitter, and wherein reversing the positions of the samples of the transmitter pre-processed, generating a transmitter discrete Fourier transform representation, and transmitting the discrete Fourier transform representation to a receiver as audio metadata are performed at specified intervals by the transmitter.

12. The method of claim 1, wherein pre-processing the second audio signal is performed continuously by the receiver, and wherein generating a receiver discrete Fourier transform representation, generating a correlation result in a discrete Fourier transform representation, performing an inverse Fourier transform on the correlation result in a discrete Fourier transform representation, and determining a relative delay value based on the position in the correlated signal of a sample comprising a value with the greatest magnitude of the values of the samples of the correlated signal, are performed at specified intervals by the receiver.

13. A method comprising:
receiving audio metadata comprising a discrete Fourier transform representation;
pre-processing an audio signal;
generating a second discrete Fourier transform representation from the pre-processed audio signal;
generating a correlation result in a discrete Fourier transform representation based on an element-wise multiplication of the discrete Fourier transform representation and the second discrete Fourier transform representation;
performing an inverse Fourier transform on the correlation result in a discrete Fourier transform representation to generate a correlated signal comprising one or more samples, each sample having a position in the correlated signal and comprising a value;
determining a relative delay value based on the position in the correlated signal of a sample comprising a value with the greatest magnitude of the values of the samples of the correlated signal; and
adjusting playback of a second audio signal based on a current delay value adjusted based on the relative delay value by adding the relative delay value to a histogram,
determining an adjustment to the current delay value based on the histogram,
adjusting the current delay value based on the determined adjustment, and
adjusting the playback of the second audio signal so that value of a total delay in playback of the second audio signal moves towards the current delay value if the total delay is not equal to the current delay value.

14. The method of claim 13, wherein pre-processing the audio comprises one or more of sampling the audio signal, filtering the audio signal, and down sampling the audio signal.

15. The method of claim 13, wherein the audio signal is generated by a microphone.

16. The method of claim 13, wherein the second audio signal is received from a transmitter and comprises an audio signal based on source audio signals on which the discrete Fourier transform representation in the audio metadata is based.

17. The method of claim 13, wherein the audio metadata further comprises a root mean square value.

18. A method comprising:
pre-processing an audio signal to generate a pre-processed audio signal comprising samples, each sample comprising a value and having a position in the pre-processed audio signal;
reversing the positions of the samples of the pre-processed audio signal to generate a reversed audio signal;
generating a discrete Fourier transform representation from the reversed audio signal;
determining a root mean square value based on the audio signal; and
transmitting the discrete Fourier transform representation to one or more receivers as audio metadata and transmitting the root mean square value to the one or more receivers with the discrete Fourier transform representation as additional audio metadata.

19. The method of claim 18, further comprising transmitting a second audio signal to the one or more receivers, wherein the second audio signal is based on source audio signals on which the audio signal that is pre-processed is also based.

20. The method of claim 19, wherein transmission of the second audio signal is delayed based on a distance to a nearest speaker.

21. A device comprising:
a microphone that generates an audio signal;
a wireless radio that receives a second audio signal and audio metadata comprising a discrete Fourier transform representation; and
one or more hardware devices for processing audio signals that pre-process the audio signal generated by the microphone, generate a second discrete Fourier transform representation from the pre-processed audio signal, generate a correlation result in a discrete Fourier transform representation based on an element-wise multiplication of the discrete Fourier transform representation and the second discrete Fourier transform representation, perform an inverse Fourier transform on the correlation result in a discrete Fourier transform representation to generate a correlated signal comprising one or more samples, each sample having a position in the correlated signal and comprising a value, determine a relative delay value based on the position in the correlated signal of a sample comprising a value with the greatest magnitude of the values of the samples of the correlated signal, and adjust playback of a second audio signal based on a current delay value adjusted based on the relative delay value by adding the relative delay value to a histogram, determining an adjustment to the current delay value based on the histogram, adjusting the current delay value based on the determined adjustment, and adjusting the playback of the second audio signal so that value of a total delay in playback of the second audio signal moves towards the current delay value if the total delay is not equal to the current delay value.

22. The device of claim 21, wherein one of the one or more hardware devices for processing audio is an ADC that converts the audio signal generated by the microphone from an analog audio signal to a digital audio signal.

23. The device of claim 21, wherein one of the one or more hardware devices for processing audio is a processor with a built-in Fourier transform function.

24. The device of claim 21, wherein the one or more hardware devices for processing audio adjust playback of the second audio signal by resampling the second audio signal to add or drop samples.

25. The device of claim 21, further comprising a sound generating device that generates sound based on the second audio signal.

26. A device comprising:
a transmission device that transmits an audio signal and audio metadata; and
a computing device that pre-processes a second audio signal to generate a pre-processed audio signal comprising samples, each sample comprising a value and having a position in the pre-processed audio signal, reverses the positions of the samples of the pre-processed audio signal to generate a reversed audio signal, generates a discrete Fourier transform representation from the reversed audio signal, determines a root mean square value based on the audio signal and causes the transmission device to transmit the discrete Fourier transform representation to one or more receivers as the audio metadata and transmit the root mean square value to the one or more receivers with the discrete Fourier transform representation as additional audio metadata.

27. The device of claim 26, wherein the transmission device is a wireless access point.

28. The device of claim 26, wherein the device further comprises one or more inputs for one or more audio signals, and wherein the one or more audio signals are analog or digital.

29. The device of claim 28, wherein the audio signal and the second audio signal are based on one or more audio signals received at the one or more inputs.

* * * * *